US009957439B2

(12) United States Patent
van Oort et al.

(10) Patent No.: US 9,957,439 B2
(45) Date of Patent: May 1, 2018

(54) FRACTURING FLUID FOR PREVENTION OF SHALE FRACTURE HYDRATION DURING WELL STIMULATION BY HYDRAULIC FRACTURING

(71) Applicants: Eric van Oort, Austin, TX (US); John David Downs, Lincolnshire (GB)

(72) Inventors: Eric van Oort, Austin, TX (US); John David Downs, Lincolnshire (GB)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days. days.

(21) Appl. No.: 14/960,085

(22) Filed: Dec. 4, 2015

(65) Prior Publication Data
US 2016/0160118 A1 Jun. 9, 2016

Related U.S. Application Data

(60) Provisional application No. 62/088,421, filed on Dec. 5, 2014.

(51) Int. Cl.
*C09K 8/68* (2006.01)
*C09K 8/88* (2006.01)
*C09K 8/80* (2006.01)

(52) U.S. Cl.
CPC ............... *C09K 8/68* (2013.01); *C09K 8/885* (2013.01); *C09K 2208/28* (2013.01)

(58) Field of Classification Search
None
See application file for complete search history.

(56) References Cited

U.S. PATENT DOCUMENTS

| | | | | |
|---|---|---|---|---|
| 3,836,465 A | * | 9/1974 | Rhudy et al. | C09K 8/62 166/307 |
| 6,187,842 B1 | * | 2/2001 | Kobayashi | A61K 8/042 127/30 |
| 2005/0199428 A1 | * | 9/2005 | Dixon | C09K 8/035 175/65 |

OTHER PUBLICATIONS

Downs, J.D. et al., TAME—a new concept in water-based drilling fluids, paper SPE 26699 presented at the 1993 Offshore Europe, Aberdeen, Scotland, Sep. 7-10.
Bland, R.G. et al., Low salinity polyglycol water-based drilling fluids as alternatives to oil-based muds, paper SPE/IADC 29378 presented at the 1995 SPE/IADC Drilling Conference, Amsterdam, the Netherlands, Feb. 28-Mar. 2.

* cited by examiner

*Primary Examiner* — Jeffrey Washville
(74) *Attorney, Agent, or Firm* — Baker Botts L.L.P.

(57) ABSTRACT

Friction reducers for hydraulic fracturing fluids, hydraulic fracturing fluids containing the friction reducers, and methods of making and using same are disclosed. The friction reducers comprise ethylene oxide polymers, propylene oxide polymers, ethylene oxide-propylene oxide co-polymers, and combinations thereof, and can further comprise a dispersant, such as polypropylene glycol. The friction reducer formulations can be active across a wide range of brine salinities, and tolerant of high levels of divalent cations in solution. The friction reducers can have a cloud point temperature, above which temperature they can precipitate out of solution and deposit on a surface of a hydrocarbon-bearing formation to inhibit hydration of the shale formations lining the fractures.

24 Claims, 19 Drawing Sheets

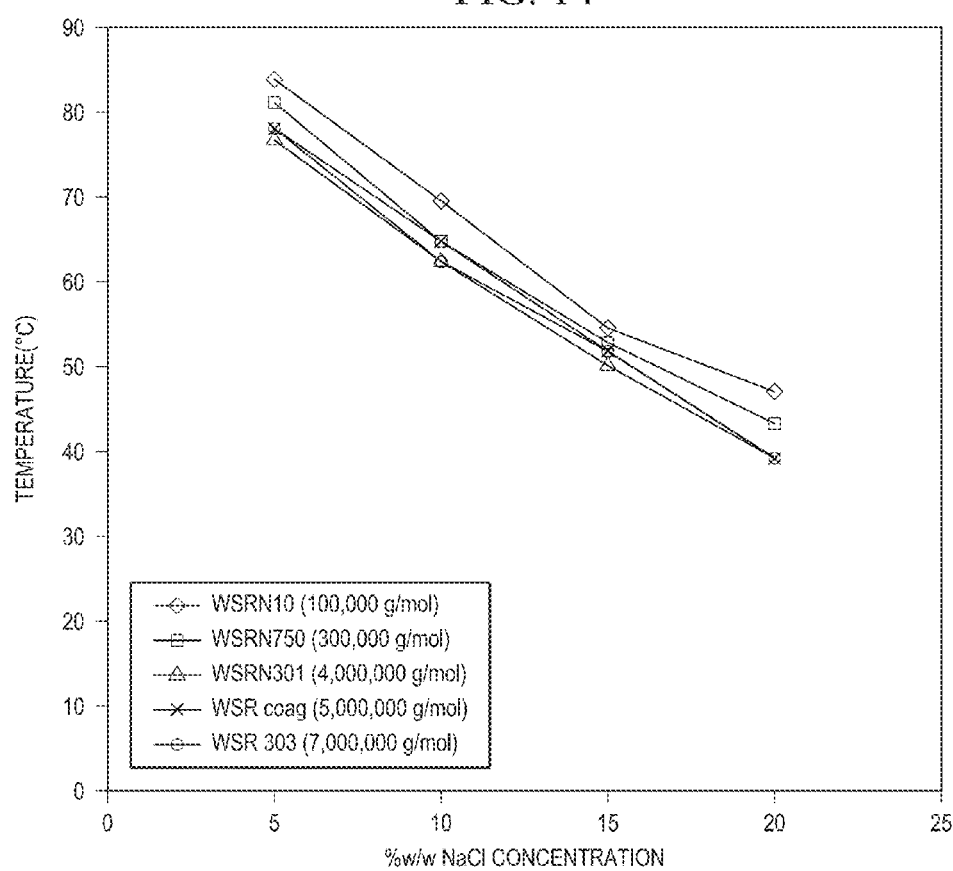

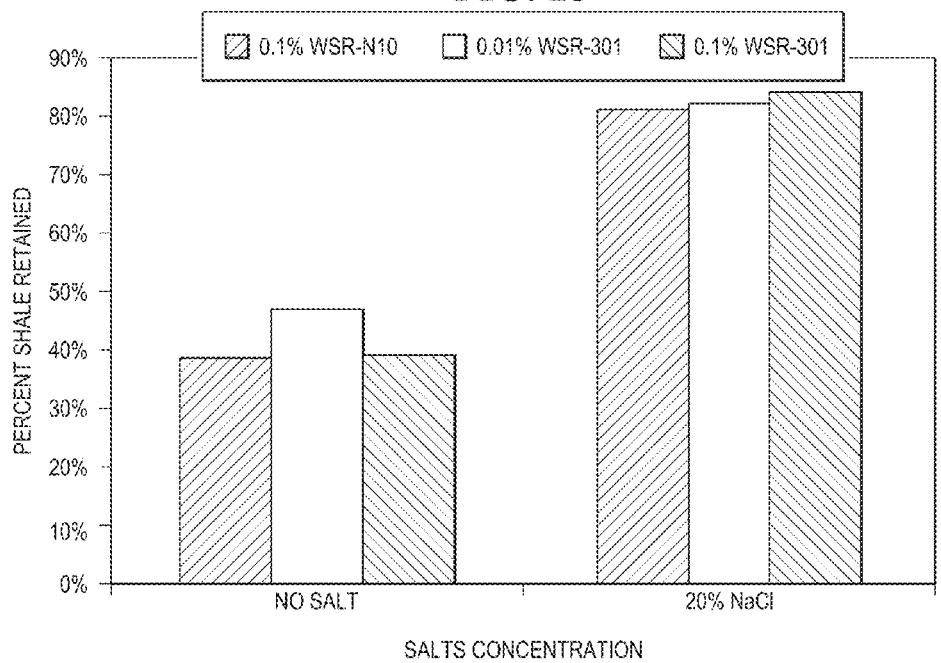

FRACTURING FLUID FOR PREVENTION OF SHALE FRACTURE HYDRATION DURING WELL STIMULATION BY HYDRAULIC FRACTURING

PRIORITY CLAIM

The present application claims priority under 35 U.S.C. § 119 to U.S. Provisional Patent Application Ser. No. 62/088,421 filed Dec. 5, 2014 and titled FRACTURING FLUID FOR PREVENTION OF SHALE FRACTURE HYDRATION DURING WELL STIMULATION BY HYDRAULIC FRACTURING, the contents of which are hereby incorporated by reference in their entirety.

TECHNICAL FIELD

The present disclosure relates to hydraulic fracturing fluids comprising an aqueous base fluid and a novel salt-tolerant friction reduction package with clouding and shale inhibition properties.

TECHNICAL BACKGROUND

Hydraulic fracturing is the primary technique for accessing shale-bound hydrocarbons. Commonly, water with small concentrations of friction reducer—"slickwater"—is used to fracture tight gas formations with very low permeability, such as shale. Typically, after wellbore formation, slickwater is injected at high pressure and flow rate into the wellbore to form fractures in hydrocarbon-bearing shale formations through which the hydrocarbons are extracted. Once the fluid flows back from the subsurface, gas is free to flow out of the formation rock to surface production infrastructure.

Aqueous fracturing fluids generally contain proppant and chemical additives. Most commonly, polyacrylamides are incorporated as friction reducers to permit sustained injection pressure of the fracturing fluid at depth. The industry standard for reducing pipe friction pressure in hydraulic fracturing is to use either a polyacrylamide friction reducer emulsified in oil, or a variation of this, including acrylamide copolymers or granulated polyacrylamides. Generally, polyacrylamide is added "on the fly" and in a concentration on the order of one gallon or part per thousand to create the ubiquitous "slickwater" in fracturing operations.

Prior to hydrocarbon production, efforts are made to back-produce water used for hydraulic fracturing. Typically, however, only a fraction of the original fracturing water is recovered in back-production. The remaining fluid interferes with hydrocarbon production due to the presence of water within the fractures acting as a hydrocarbon flow barrier, as well as shale clay hydration and concomitant swelling, which results in fracture closure and proppant embedment.

Furthermore, the continued expansion of hydraulic fracturing activity—especially in slickwater operations—has given rise to concerns regarding water quantity and quality. One of the most pressing issues facing the fracturing industry is the dilemma of sourcing water for operations and treating or disposing of the water returned after injection. On one hand, operators in arid areas must compete with other users to obtain enough fresh water to perform fracturing operations, while in other areas the flowback water after a treatment must be either treated or disposed of in injection wells, often at great cost.

Reuse of saline formation waters from flowback can help to alleviate both of these problems. However, the formation waters that contain concentrated and difficult-to-remove salt ions—especially divalent cations—cannot be used with typical polyacrylamide friction reducers, due to these additives' dramatically decreased effectiveness in such fluids. Onsite treatment of flowback water is often expensive, and blending of back-produced fracking fluids with fresh water is also an undesirable option, since the contaminants returned with flowback water can detrimentally affect conventional friction reducers that are affected by salt ions. Without friction reduction, the enormous flow rates needed to suspend proppant and fracture a shale formation cannot be achieved safely nor economically.

SUMMARY

In accordance with the disclosed subject matter, compositions for reducing the friction exerted upon a fracturing fluid during a fracturing operation ("friction reducers"), and fracturing fluids comprising same, are provided. Associated methods of making a fracturing fluid comprising the friction reducers and methods of using the friction reducers and fracturing fluids comprising same are also provided.

In one aspect of the present disclosure, fracturing fluids are provided. In certain embodiments, the fracturing fluids comprise an aqueous base fluid and a friction reducer, wherein the friction reducer comprises a polymer selected from the group consisting of ethylene oxide polymers, propylene oxide polymers, ethylene oxide-propylene oxide co-polymers, and combinations thereof. The concentration of the polymer can be about 0.1% by weight or less of the fracturing fluid. In certain embodiments, the polymer is polyethylene oxide having a molecular weight between about 1,000,000 and about 7,000,000.

In a related aspect of the present disclosure, methods of stimulating a wellbore in a hydrocarbon bearing formation are provided. In certain embodiments, the methods comprise adding a friction reducer to an aqueous base fluid to form a fracturing fluid, introducing the fracturing fluid into a wellbore, and contacting the formation with the fracturing fluid, wherein the friction reducer comprises a polymer selected from the group consisting of ethylene oxide polymers, propylene oxide polymers, ethylene oxide-propylene oxide co-polymers, and combinations thereof. In certain embodiments, the friction reducer further comprises a dispersant in a weight ratio of about 1:1 to about 10:1 relative to the polymer. In certain embodiments, the dispersant is polypropylene glycol. In certain embodiments, the friction reducer is added to the aqueous base fluid less than one hour before introduction of the fracturing fluid into the wellbore. In certain embodiments, the friction reducer is added to the aqueous base fluid substantially contemporaneously to introducing the fracturing fluid into the wellbore. In certain embodiments, the method includes refracturing a wellbore, such as a wellbore that has previously been treated with a fracturing fluid containing a conventional fracturing fluid additive.

In a related aspect of the present disclosure, a friction reducer for a fracturing fluid is provided. In certain embodiments, the friction reducer comprises a solution of polyethylene oxide having a molecular weight between 1,000,000 and 7,000,000 and polypropylene glycol. In certain embodiments, the polypropylene glycol and polyethylene oxide are provided in a weight ratio of between about 1:1 to about 10:1.

In further related aspects of the present disclosure, the friction reducer comprises a cloud point glycol. In certain embodiments, the cloud point glycol polymers can precipitate out of the fracturing fluid solution at elevated in situ temperatures at a surface of a fracture in a hydrocarbon-bearing shale to exclude the aqueous fracturing fluid and thereby prevent hydration of the fractured shale.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

FIG. 14 is a graph of cloud point temperatures for various polyethylene oxides in solutions containing specified concentrations of NaCl.

FIG. 23 is a graph of percentage shale retained in shale retention experiments conducted at elevated temperature for representative friction reducers according to the present disclosure having different molecular weights and different concentrations in solution.

DESCRIPTION

Figure 1:
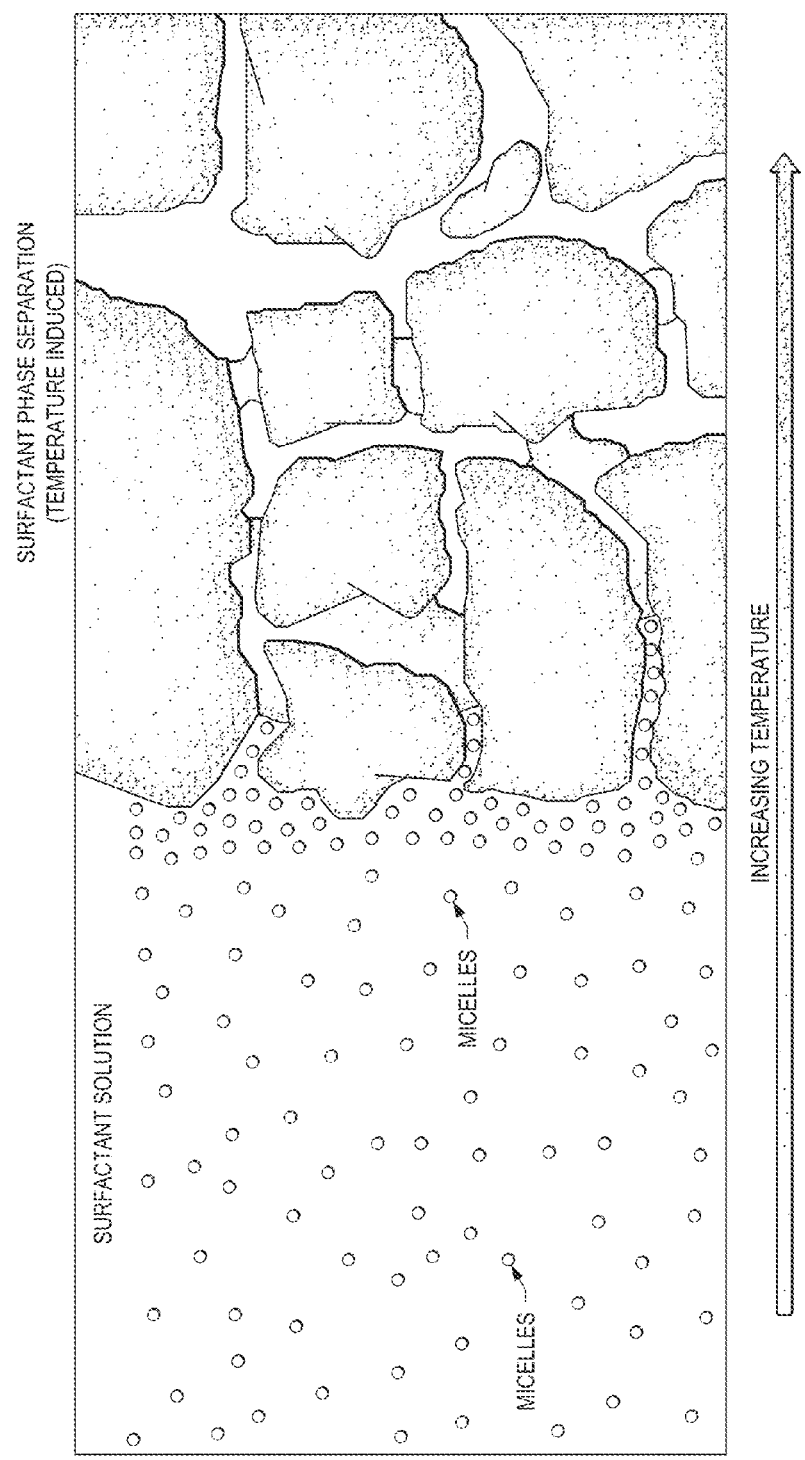
FIG. 1 is a schematic illustration of precipitation of and shale protection by representative friction reducers comprising a cloud point glycol polymer at elevated temperatures in situ according to certain embodiments of the present disclosure

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Definitions

As used in the specification and the appended claims, the singular forms "a," "an" and "the" include plural referents unless the context clearly dictates otherwise. Thus, for example, reference to "a solvent" includes mixtures of two or more solvents.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

In accordance with the present disclosure, friction reducers for fracturing fluids, and fracturing fluids comprising same, are provided. The fracturing fluids further comprise an aqueous base fluid. Reference will now be made in detail to exemplary embodiments according to the disclosed subject matter.

Friction Reducers

In accordance with the present disclosure, fracturing fluids comprising a friction reducer are provided. Generally, friction reducers are provided in hydraulic fracturing fluid to reduce drag on the fracturing fluid as it is pumped into a wellbore to fracture the surface of a hydrocarbon-bearing subterranean formation. Friction reducers are essential to permit pumping of fracturing fluid at sufficient pressure and flow rate to a formation with sustainable surface pressure. Fracturing fluids to date have employed friction reducers composed of acrylamide polymers.

In certain embodiments of the present disclosure, a friction reducer for a hydraulic fracturing fluid is provided, the friction reducer comprising at least one type of polymer. The polymer can be a linear, hydrophilic polymer. In certain embodiments, the polymer is a polyalkylene oxide polymer. Suitable polyalkylene polymers include polyethylene oxide, polypropylene oxide, co-polymers of polyethylene oxide and polyalkylene oxide, and combinations thereof. The molecular weight of the polymer can be between about 10,000 (g/M) and about 10,000,000 (g/M). In certain embodiments, the molecular weight of the polymer is between about 100,000 and about 10,000,000. In certain embodiments, the molecular weight of the polymer is between about 500,000 and about 7,000,000. In certain embodiments, the molecular weight of the polymer is between about 1,000,000 and about 7,000,000. In certain embodiments, the molecular weight of the polymer is between about 1,000,000 and about 5,000,000.

In certain embodiments, the at least one linear, hydrophilic polymer includes a polyethylene oxide polymer. Suitable polyethylene oxide polymers for use with the present disclosure include, for example and without limitation, Polyox™ compounds (available from DOW chemicals), including WSR N-10, having a molecular weight of 100,000 g/M, WSR N-80 having a molecular weight of 200,000, WSR N-750, having a molecular weight of 300,000 g/M, WSR 205, having a molecular weight of 600,000, WSR 1105, having a molecular weight of 900,000, WSR N-12K, having a molecular weight of 1,000,000, WSR N-60K, having a molecular weight of 2,000,000, WSR-301, having a molecular weight of 4,000,000, WSR coagulant, having a molecular weight of 5,000,000, WSR 303, having a molecular weight of 7,000,000, WSR 308, having a molecular weight of 8,000,000, WSR N-3000, having a molecular weight of 400,000, UCARFLOC Polymer 300, having a molecular weight of 4,000,000, UCARFLOC Polymer 302, having a molecular weight of 5,000,000, UCARFLOC polymer 304, having a molecular weight of 7,000,000, and UCARFLOC Polymer 309, having a molecular weight of 8,000,000.

In certain embodiments, including those in which the at least one polymer is a polyethylene oxide, a polypropylene oxide, or a combination thereof, the polymer is environmentally benign, readily biodegradable and non-toxic to humans and animals.

The at least one polymer can be provided in a concentration between about 0.001% and about 5% by weight of the fracturing fluid. In certain embodiments, the concentration of the at least one polymer is between about 0.005% and about 1%. In certain embodiments, the concentration of the at least one polymer is between about 0.005% and about 0.5%. In certain embodiments, the concentration of the at least one polymer is between about 0.005% and about 0.1%. In certain embodiments, the concentration of the at least one polymer is between about 0.005% and about 0.05%.

It has surprisingly been discovered that the friction reducing polymers of the present disclosure provide effective friction reduction of a fracturing fluid at a concentration of 0.1% or less at a broad range of fracturing fluid salinities. In certain embodiments, the concentration of the at least one polymer is less than about 0.1%, or less than about 0.05%, or less than about 0.025%. In certain embodiments, the concentration is about 0.01%.

A range of friction reduction can be achieved by the friction reducers of the present disclosure. A number of variables can influence the friction reduction observed for a given fracturing fluid in a given fracturing operation. In certain embodiments, friction exerted upon the fracturing fluid is reduced by about 20%, or by about 25%, or by about 30%, or by about 35%, or by about 40%, or by about 45%, or by about 50%, or by about 55%, or by about 60%, or by greater than about 60% relative to a substantially similar fracturing fluid not comprising a friction reducer according to the present disclosure. In these embodiments, the friction reduction beneficially reduces the hydraulic pressure required to inject the fracturing fluid at pressure sufficient to fracture the shale and additionally or alternatively permits injection of the fracturing fluid with greater pressure on the shale.

Dispersants

In accordance with the present disclosure, the friction reducer can optionally further comprise, in addition to at least one friction reducing polymer, a dispersant for the at least one polymer. The dispersant can be provided as a solvent or co-solvent for the at least one friction reducing polymer. Such dispersants can advantageously permit relatively rapid dispersal of the at least one polymer in the fracturing fluid, without the need for time-consuming, expensive, and often unfeasible pre-mixing and storage of large volumes of fracturing fluid. Such dispersants can permit the addition of the friction reducer to the aqueous base fluid shortly prior to and/or during pumping of the fracturing fluid downhole to stimulate a hydrocarbon bearing formation. In contrast to presently available friction reducers, it has surprisingly been discovered that friction reduction is observed on the order of seconds after combination of an aqueous base fluid and a friction reducer comprising a dispersant and at least one friction reducing polymer according to the present disclosure.

In certain embodiments, the dispersant is a low molecular weight liquid comprising at least one $C_1$-$C_6$ alcohol or diol. By way of example, and not limitation, the dispersant can be 2-butoxyethanol, isopropanol, ethylene glycol, or polypropylene glycol. The molecular weight of the dispersant can be between about 20 and about 10,000, or about 50 and about 2,000, or about 100 and about 1,000. In certain embodiments, the dispersant is environmentally benign and is compatible with (i.e., non-degrading to) the formation and all equipment and conduits that it will contact during a fracturing operation. In certain embodiments, the dispersant is polypropylene glycol having a molecular weight of 400, available from Dow Chemical Company.

The dispersant can be provided at a range of weight ratios relative to the at least one polymer. In certain embodiments, the dispersant is provided in a weight ratio of about 1:2 to about 20:1 relative to the at least one polymer. In certain embodiments, the dispersant is provided in a weight ratio of about 1:1 to about 1:10.

Cloud Point Glycols

In certain embodiment in accordance with the present disclosure, the friction reducing polymer and/or the dispersant is or includes one or more cloud point glycol polymers for the prevention of shale fracture hydration. Shale hydration is desirably avoided in fracturing operations due to the expansion in volume that results as the shale hydrates. The expansion in volume results in fracture closure and decreased hydrocarbon permeability, resulting in reduced hydrocarbon production. In particular, productive half-length of a fracture, defined as the radial distance from the wellbore to the outer tip of the fracture propagated from the well by hydraulic fracturing, will decrease with shale swelling associated with shale hydration by the fracturing fluid. Fracturing fluid itself will result in water-locking of narrow fractures, further reducing hydrocarbon permeability.

Thus the present disclosure provides, in various aspects, a fracturing fluid associated with greater productive half-length of a fracture in a hydrocarbon-bearing shale and associated increases in initial hydrocarbon production and ultimate hydrocarbon recovery volumes. In further aspects, a fracturing fluid associated with reduced absorption of water into the hydrocarbon-bearing shale and fracture and improved back-production after fracturing is provided. The improved back-production associated with the fracturing fluid permits greater re-use of the fracturing fluid in subsequent operations, thereby reducing water consumption associated with fracturing operations. Accordingly, in additional aspects of the present disclosure, a fracturing fluid having improved efficiency of back-production after fracturing is provided. This improved back-production facilitates re-use of the fracturing fluid, reducing total water consumption and associated cost and environmental impact. In further aspects, a method of forming at least one preserved fracture within a hydrocarbon-bearing shale formation is provided.

These and other aspects of the present disclosure are accomplished at least in part by providing a fracturing fluid comprising one or more polymers having reverse solubility characteristics at elevated temperatures (i.e. by incorporation of one or more cloud point glycol polymers). In certain embodiments, a fracturing fluid comprising one or more cloud point glycol polymers is provided. The fracturing fluid is injected at pressure to form at least one fracture in a hydrocarbon-bearing formation, thereby increasing the permeability of the hydrocarbon-bearing formation to permit production or extraction of the hydrocarbons in the formation. In certain embodiments of the present disclosure, the cloud point glycols in the fracturing fluid remain in solution at ambient temperatures, but precipitate out of solution at the elevated in situ temperatures encountered downhole, and particularly at the surface of fractures formed by injection of the fracturing fluid at high pressure into the hydrocarbon-bearing shale formation. The precipitated cloud point glycols form water insoluble barrier layer at the surface of the fractures to prevent hydration and associated swelling of the shale, and thereby preventing hydration associated decreases in fracture half-length. The water insoluble barrier formed by the precipitated cloud point glycols further excludes aqueous fluid, thereby preventing fracture water locking and facilitating back-production of the fracturing fluid.

For the purpose of the present disclosure, a "cloud point glycol" refers to a glycol polymer that is soluble at low temperatures but which precipitates, such as by forming micelles, at an elevated temperature of the solution to form a second phase. The cloud point glycol polymers accordingly exhibit a reverse solubility whereby their solubility decreases with elevated temperature. The elevated temperature of the solution at which the glycol polymer precipitates is the cloud point temperature of the solution, i.e., the temperature of a solution at which the dissolved solid polymers are no longer completely soluble and begin to precipitate out of solution. A "hydrocarbon-bearing shale" refers to a low permeability rock formations formed by deposition of strata of one or more clays that contain hydrocarbons suitable for extraction.

The mechanism by which the at least one cloud point glycol protects the shale formation from hydration is illustrated in FIG. 1. With reference to FIG. 1, the increasing temperature in situ from left to right (i.e., with increasing proximity to the shale surface of the newly exposed fracture surfaces) results in precipitation of the cloud point glycols as micelles. At the surface of the fractures, substantially complete phase separation is observed, and the cloud point glycols form an emulsion block in the shale formation. The emulsion block prevents water influx and hydration of the shale formation. The cloud point glycol emulsions are oleophilic, and thus the emulsion blocks will rapidly mix with, and dissolve in, hydrocarbons after back-production of the fracturing fluid solvent fraction upon commencement of production from the hydrocarbon-bearing shale.

Accordingly, in certain embodiments of the present disclosure, the aqueous fracturing fluid comprises a friction reducer (i.e., a friction reducing polymer and, optionally, a dispersant) as disclosed above wherein one or both of the friction reducing polymer and the dispersant is or comprises a cloud point glycol. Suitable cloud point glycol friction reducers include, without limitation, the friction reducing polymers identified above. Suitable cloud point glycol friction reducer dispersants include, without limitation, the dispersants identified above.

In certain embodiments, the fracturing fluid comprising one or more cloud point glycols has a cloud point temperature 90 degrees Celsius or lower and a salinity of between about 0.1% and about 20%. In further embodiments, the cloud point temperature is 85 degrees or lower. In further embodiments, the cloud point temperature is 80 degrees or lower. In further embodiments, the cloud point temperature is 75 degrees or lower. In further embodiments, the cloud point temperature is 70 degrees or lower. In further embodiments, the cloud point temperature is 65 degrees or lower. In further embodiments, the cloud point temperature is 60 degrees or lower. In certain embodiments, the fracturing fluid is a brine having a total concentration of one or more dissolved salts greater than 0.1% by weight, or greater than 1%, or 5%, or 10% by weight. As discussed in additional detail in the examples, the cloud point temperature of the disclosed fracturing fluids is dependent to a large degree on the salinity of the fluid and the specific salt or salts in solution, rather than the molecular weight of the cloud point glycol. Table 1 below provides representative experimentally determined cloud point temperatures for solutions of sodium chloride of varying concentration and PEOs having different molecular weights at a concentration of 0.1% by weight.

TABLE 1

Cloud Point Temperature Based On Cloud Point Glycol and Salinity

| Salinity | Cloud Point Temperature (° C.) based on Cloud Point Glycol (0.1% w/w) | | | |
|---|---|---|---|---|
| | WSRN10 (100,000 g/M) | WSRN750 (300,000 g/M) | WSR coag (5,000,000 g/M) | WSR 303 (7,000,000 g/M) |
| 0% NaCl | >100 | >100 | 98 | 98 |
| 5% NaCl | 81.5 | 79 | 77 | 76.5 |
| 10% NaCl | 66 | 63.5 | 62 | 62.5 |
| 15% NaCl | 53 | 50 | 48.5 | 48 |

Aqueous Base Fluids

In accordance with the present disclosure, fracturing fluids comprising an aqueous base fluid are provided. The aqueous base fluid can be any water-based fluid, including, without limitation, fresh water, saline water ("brine"), recycled, flowback or backproduced water, or combinations thereof. Where appropriate, the aqueous base fluid can be pre-treated to remove contaminants.

Advantageously, and in contrast with conventional polyacrylamide friction reducing polymers, the friction reducers of the present disclosure are compatible with base fluids having a high ionic concentration, due, for example, to the presence of dissolved salts. Accordingly, in certain embodiments, the aqueous base fluid is a brine having a total ionic concentration of greater than 0.1% by weight. In certain embodiments, the ionic concentration of the fracturing fluid is due to the presence of one or more dissolved salts, such as metal chlorides or metal carbonates. In certain embodiments, the salinity of the fracturing fluid is due to the presence of dissolved potassium chloride, potassium carbonate, calcium chloride, calcium carbonate, magnesium chloride, magnesium carbonate, zinc chloride, zinc carbonate, sodium chloride, sodium carbonate, or combinations thereof.

The friction reduction performance of conventional polyacrylamide friction reducers is significantly impaired in particular by the presence of divalent cations, such as calcium and magnesium ions in solution. In certain embodiments according to the present disclosure, effective friction reduction is achieved in fracturing fluids having a high concentration of divalent cations.

In certain embodiments, the ionic concentration of the aqueous base fluid is between about 0.1% and about 20% by total weight of the fluid. In further embodiments, the ionic concentration is between 1% and 15%. In further embodiments, the ionic concentration is between 2.5% and 10%. In further embodiments, the ionic concentration is between 1% and 5%.

In certain embodiments, the disclosed friction reducing formulations can beneficially improve hydrocarbon production from a hydrocarbon-producing formation. In additional and alternative embodiments, the disclosed friction reducing formulations can beneficially improve backproduction of flowback water, making it available for recycling and re-use.

Additional Fracturing Fluid Additives

In certain embodiments, and as is known in the art, the fracturing fluid can contain proppant particles to withstand closure stresses upon a fracture after fracturing pressure is withdrawn. The proppant can be have any composition known in the art, including, for purpose of example and not limitation, raw sand, curable or pre-cured resin coated sands, ceramic, and sintered bauxite. The proppant can have a density that is low, high, or intermediate, and can be porous or nonporous.

In accordance with the disclosed subject matter, the fracturing fluid can further comprise one or more additional fracturing fluid additives as known in the art. For purpose of example, and not limitation, the fracturing fluid can further comprise one or more acids, including, without limitation hydrochloric acid, one or more viscosifiers, including, without limitation, guar gum, polysaccharide, and petroleum distillate; one or more biocides, including, without limitation, glutaraldehyde and ammonium chloride; and one or more surfactants, including, without limitation, lauryl sulfate and naphthalene. The foregoing additives are merely exemplary, and any additional suitable fracturing fluid additives known in art are contemplated for use with the present disclosure.

Methods

In a further aspect of the present disclosure, methods of stimulating a hydrocarbon-bearing formation with a fracturing fluid and methods of preparing a fracturing fluid are provided.

In certain embodiments, a fracturing fluid is prepared by the addition of a friction reducer to an aqueous base fluid. The friction reducer comprises at least one friction-reducing polymer as disclosed. The friction reducer can be pre-mixed with the aqueous base fluid, such as by mixing with an agitator for an hour or longer. In certain embodiments wherein the friction reducer further comprises a dispersant, the friction reducer can be added to the aqueous base fluid without mixing. For example, the friction reducer can be added to the aqueous base fluid "on the fly," substantially contemporaneous with pumping of the fracturing fluid into a wellbore to stimulate a hydrocarbon-bearing formation. In those embodiments in which a standard or conventional hydraulic fracturing fluid pumping apparatus as known in the art is employed in a fracturing operation, the friction reducers can be introduced via an inlet to a reservoir base fluid reservoir prior to or during pumping to contact and enter into solution with the base fluid.

In addition to initial stimulation of a hydrocarbon-bearing formation near a wellbore, fracturing using fluids described herein may include re-stimulating or re-fracturing of the formation near a wellbore. For example, if a fracturing fluid with traditional additives was used initially to stimulate or fracture the hydrocarbon-bearing formation, the improved properties of fracturing fluids described herein may allow further or improved hydrocarbon recovery.

Although reference is made herein to certain exemplary fracturing fluids and methods, the present disclosure is not limited to a particular composition or method of shale stimulation. The principles of the present disclosure may be implemented by any means for hydraulic fracturing of hydrocarbon-bearing shales. Additionally, while reference is made to specific parameters, the present disclosure is not limited to these parameters, but rather extends to all parameters and dimensions practicable according to the principles of the present disclosure.

The present application is further described by means of the examples, presented below. The use of such examples is illustrative only and in no way limits the scope and meaning of the disclosed subject matter or of any exemplified term.

EXAMPLES

Example 1—Friction Reduction by Representative Friction Reducers

Experimental Methods

Figure 2:
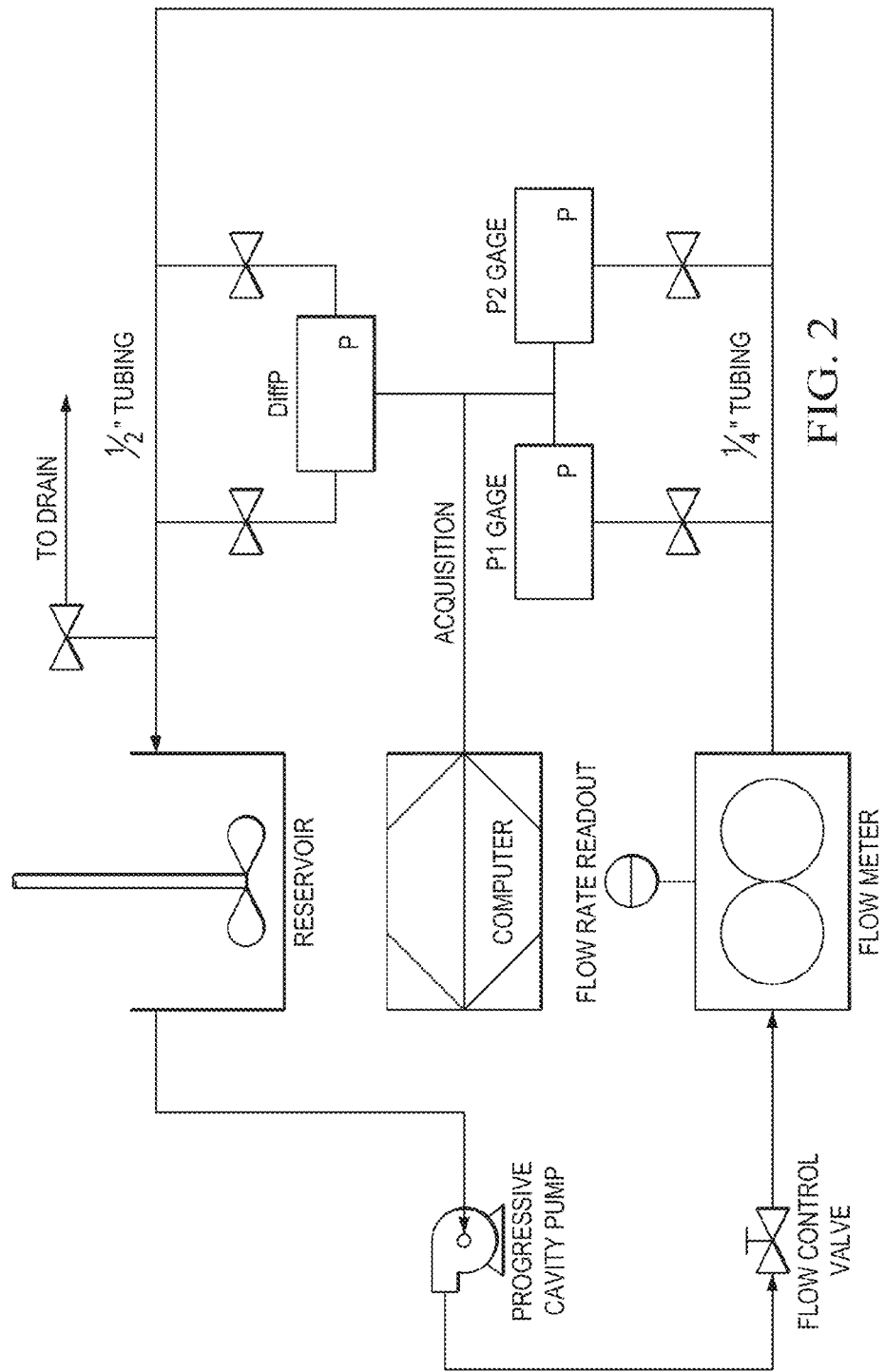
FIG. 2 is a schematic illustration of a flow loop employed for friction reduction experiments.

Friction reduction by representative friction reducers according to the present disclosure and by prior art polyacrylamide additives was measured in a flow loop configured to develop fully turbulent flow having a Reynolds number of at least 50,000. The flow loop is illustrated schematically in FIG. 2. The flow loop was assembled from a 5 gallon reservoir fitted with a 1/75 horsepower laboratory mixer, a high capacity progressive cavity pump controlled by a variable frequency drive, a nutating disc flow meter, a manual flow control valve, and 0.25 inch and 0.5 inch diameter test section piping having a length at least 100 times greater than the internal diameter to ensure full turbulence.

Each friction reduction experiment followed the same experimental protocol. Prior to testing the friction reduction of the additives, the reservoir was cleaned and the loop flushed, first with tap water and then with deionized water. For brine experiments, the experimental brine was then formed by addition and mixing of the required amount of the appropriate salt, and circulation in the flow loop is commenced. A baseline test was performed to provide a benchmark pressure drop for the additive-free fluid.

The friction reduction achieved by representative friction reducers according to the present disclosure was evaluated in various aqueous base fluids. Two prior art polyacrylamide friction reducers—DR3046, a high molecular weight polyacrylamide manufactured by SNF, Inc., and provided as an inverse emulsion, and DPFR, a salt-tolerant high molecular weight polyacrylamide manufactured by Nalco and provided in a concentrated brine dispersion—were also evaluated under identical circumstances.

The representative friction reducers according to the present disclosure were provided in solid powder form or pre-dispersed in polypropylene glycol (at a weight ratio of 5:1 PPG to friction reducing polymer). The polyacrylamide polymers and pre-dispersed friction reducing polymers according to the present disclosure were injected by syringe into the reservoir while the pump was operating. Solid friction reducing polymers according to the present disclosure were mixed in the reservoir for one hour (or three hours for WSR303), and further mixed by brief loop circulation before testing. For all experiments a constant flow rate was maintained during the first minute due to the propensity of the friction reducers to activate rapidly.

The experimental runs were performed for ten minutes while pressure was continuously monitored at the test section piping. These pressure data were used to determine friction reduction over time by comparison to the baseline testing according to the following formula:

$$FR(t) = \frac{\Delta P_{base} - \Delta P_{FR(t)}}{\Delta P_{base}}$$

Where $\Delta P_{base}$ refers to the average pressure drop observed over one minute during the baseline test for the additive-free fluid and $\Delta P_{FR(t)}$ refers to the pressure drop observed at time point (t) during the test run with the additive-containing fluid. The system was drained and flushed at the conclusion of each experiment.

Results a) Molecular Weight and Concentration

Figure 3:
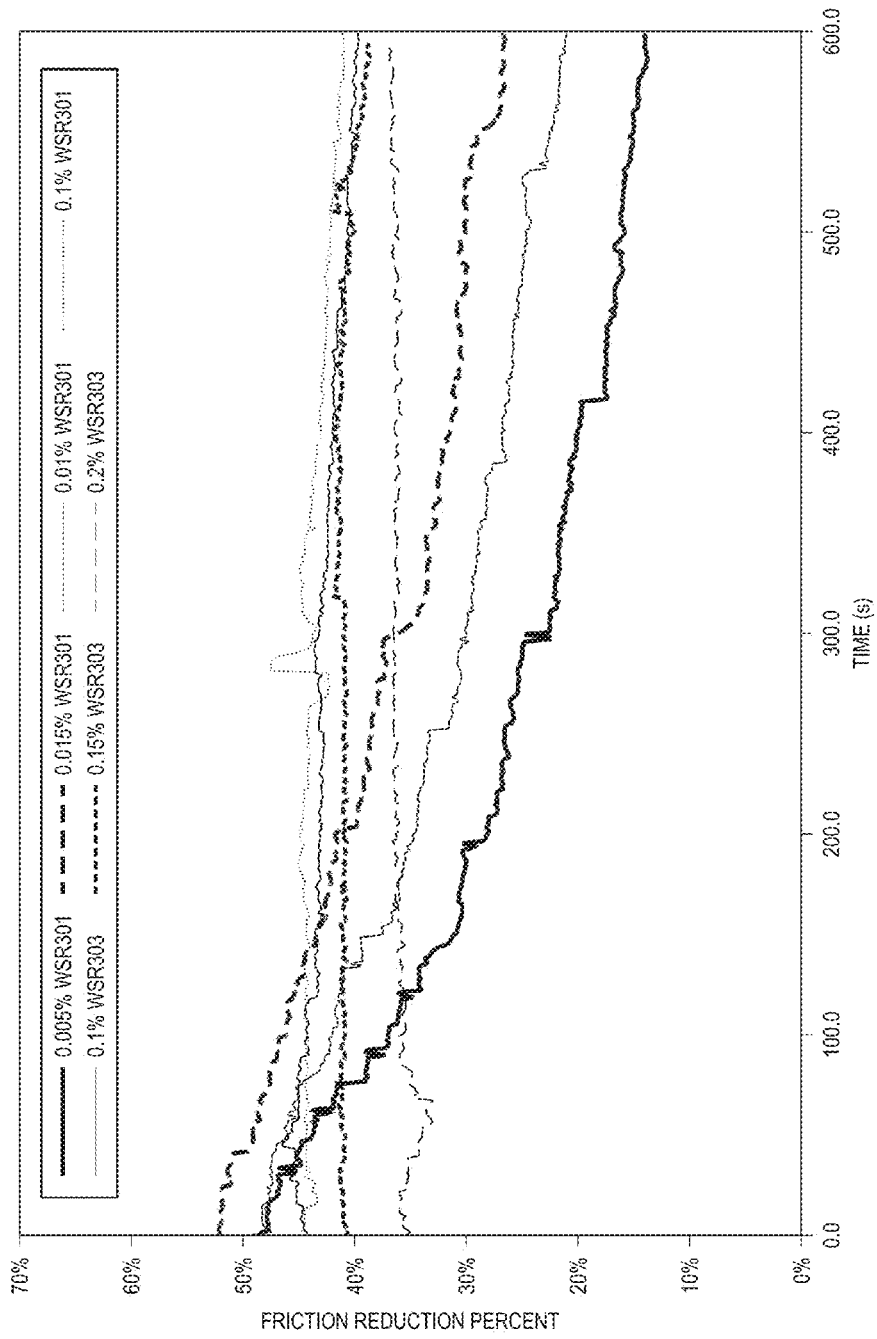
FIG. 3 is a plot of percent friction reduction over time for solutions of pre-mixed polyethylene oxide of different molecular weights and at various concentrations.

The friction reduction of premixed solutions of polyethylene oxide having a molecular weight of 1,000,000, 4,000,000, or 7,000,000 at a concentration of 0.1% in deionized water were evaluated as described. As shown in FIG. 3, friction reduction was similar for each polymer.

Figure 4:
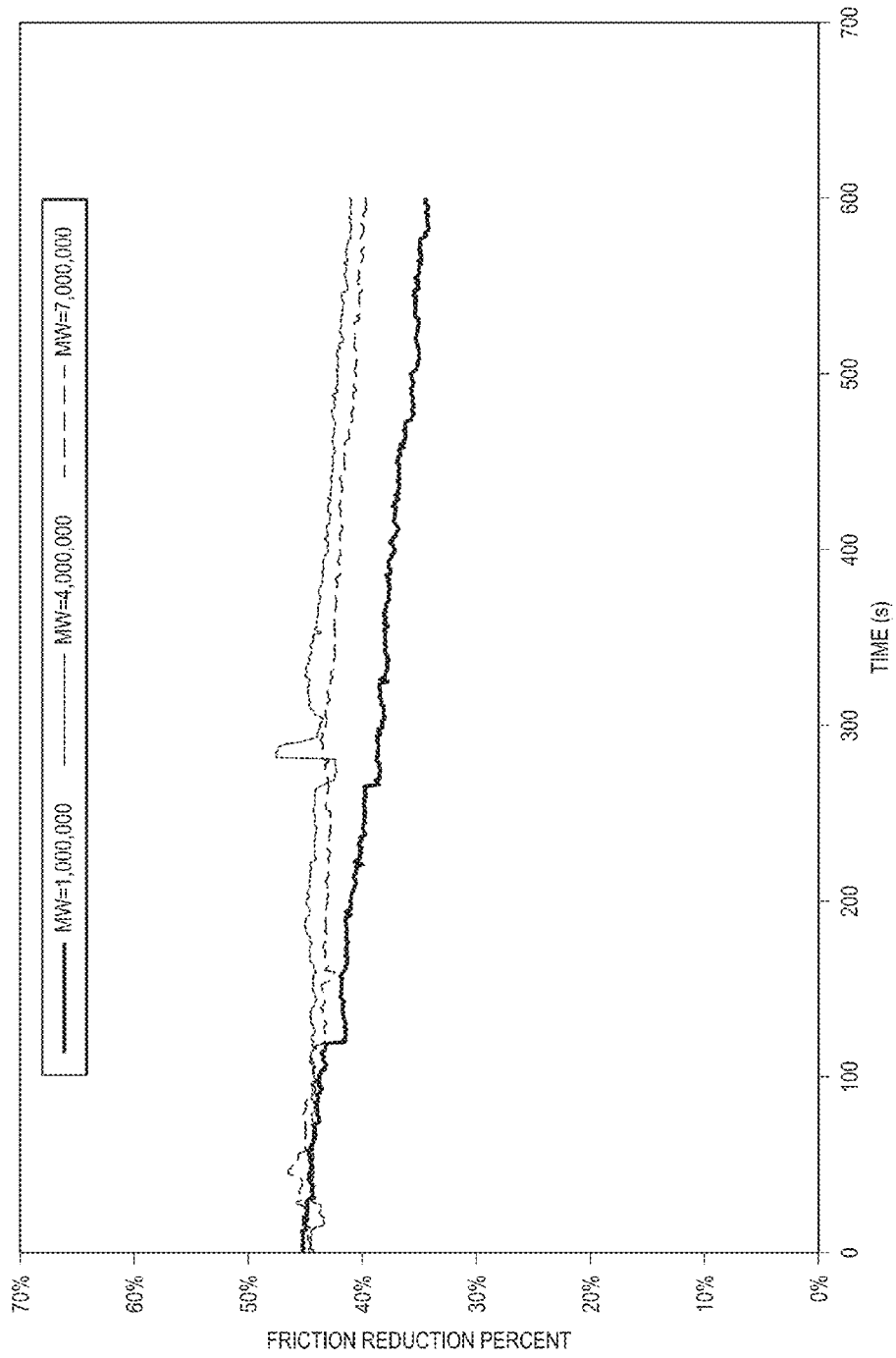
FIG. 4 is a plot of friction reduction over time for 0.1% solutions of pre-mixed polyethylene oxide of different molecular weights.

The friction reduction of pre-mixed solutions of polyethylene oxide having a molecular weight of 4,000,000 (WSR301) at concentrations of 0.005%, 0.015%, 0.01%, or 0.1% and solutions of polyethylene oxide having a molecular weight of 7,000,000 (WSR303) at concentrations 0.1%, 0.15%, or 0.2% in deionized water were evaluated. As shown in FIG. 4, each solution achieved roughly comparable initial friction reduction, with the exception of the 0.2% solution of WSR303 (due, it is believed, to the higher viscosity of this solution). The friction reduction achieved by low-concentration solutions decreased over time due, it is believed, to degradation of the polymer by shear forces during testing.

b) Comparison to Polyacrylamide Friction Reducers in Deionized Water

Figure 5:
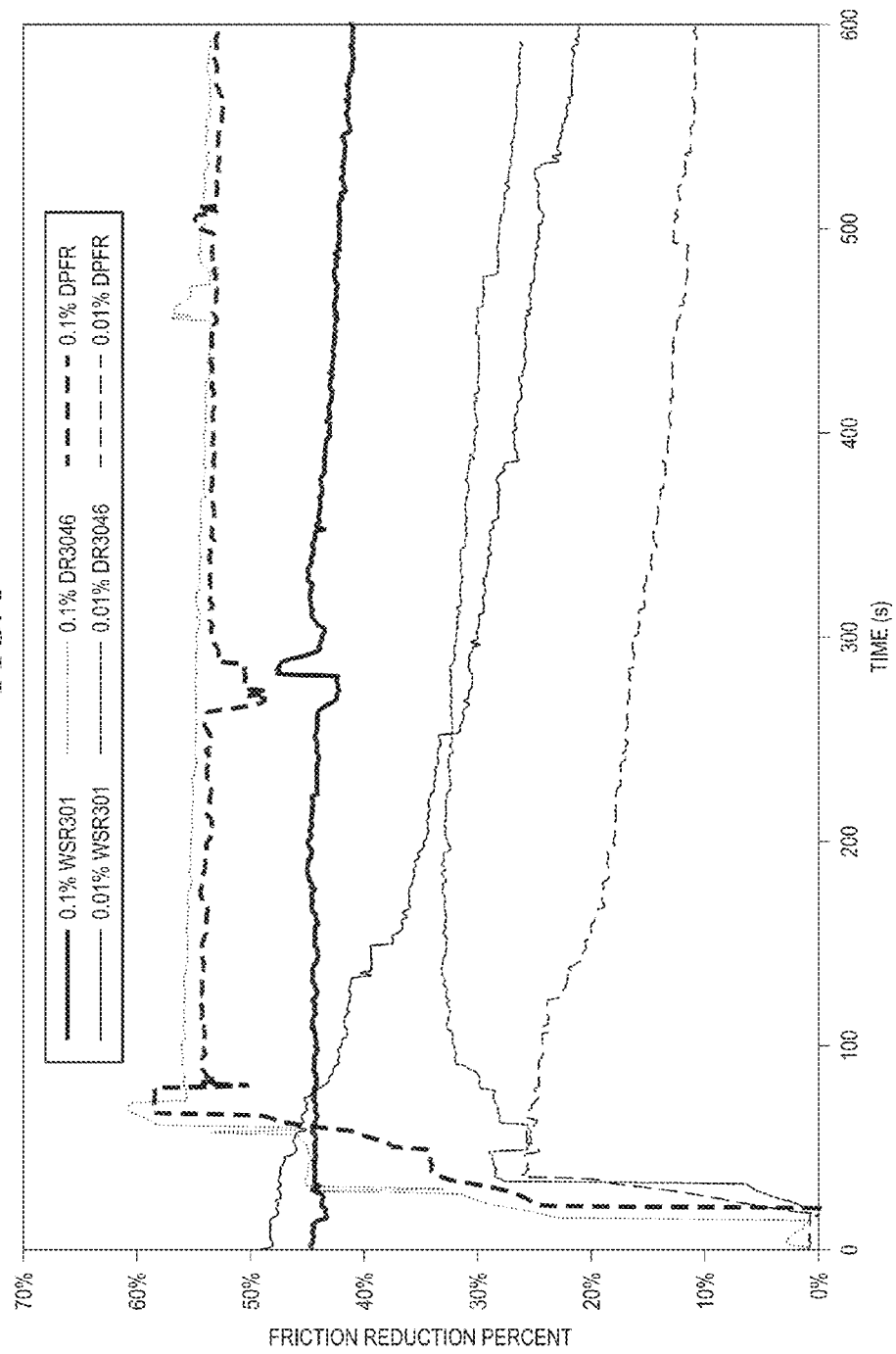
FIG. 5 is a plot of friction reduction over time for 0.01% and 0.1% solutions of pre-mixed polyethylene oxide (WSR301) and two prior art polyacrylamide friction reducers (DR3046 and DPFR) in deionized water.

Percent friction reduction for 0.1% and 0.01% premixed solutions of WSR301 and the prior art polyacrylamide friction reducers (DR3046 and DPFR) in deionized water were determined as described. As shown in FIG. 5, friction reduction by WSR301 was comparable to that of DR3046 and superior to that of DFPR. DFPR, it is noted, is recommended for use only in brines.

c) Comparison to Polyacrylamid Friction Reducers in Brines

Percent friction reduction for 0.1% and 0.01% premixed solutions of WSR301 and the prior art polyacrylamide friction reducers (DR3046 and DPFR) in 10% sodium chloride were determined as described. As shown in FIG. 5, friction reduction by WSR301 at a concentration of 0.1% was comparable to that achieved by DR3046 and DPRF at like concentration, while friction reduction friction reduction by WSR301 at a concentration of 0.01% was superior to that observed with DR3046 and DPFR at the same concentration.

Figure 6:
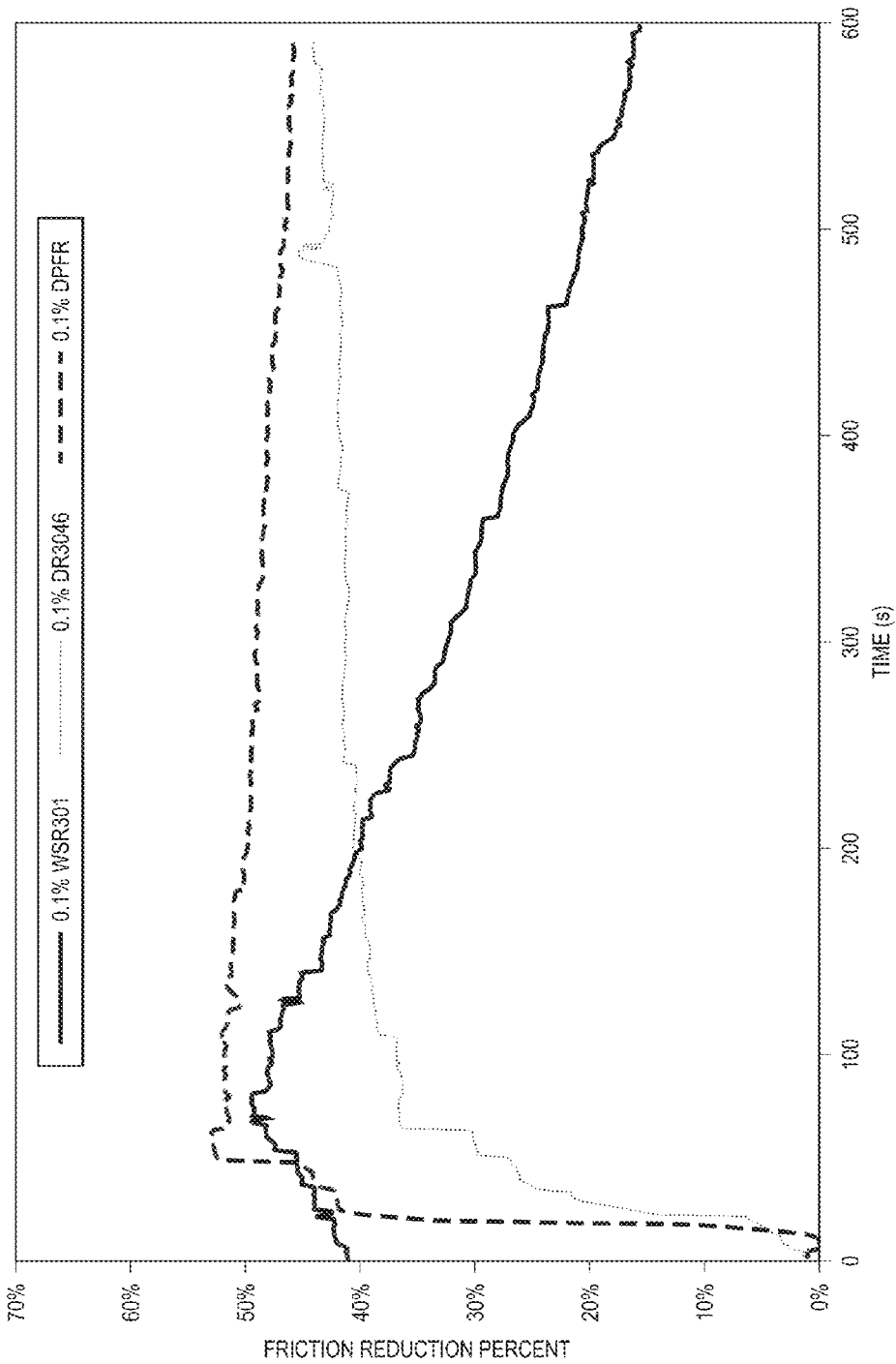
FIG. 6 is a plot of friction reduction over time for 0.01% and 0.1% solutions of pre-mixed polyethylene oxide (WSR301) and two prior art polyacrylamide friction reducers (DR3046 and DPFR) in 10% sodium chloride brine.
Figure 7:
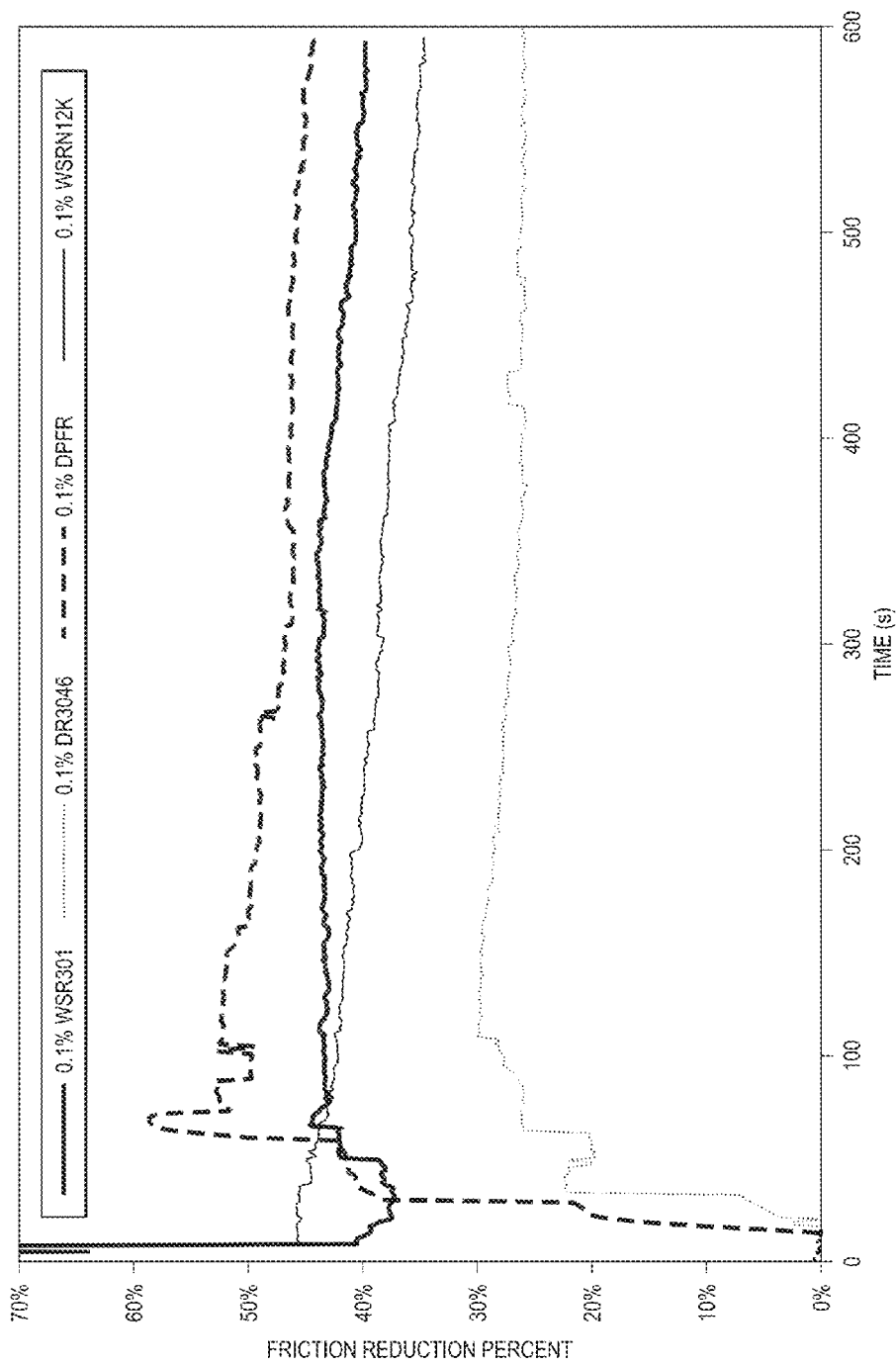
FIG. 7 is a plot of friction reduction over time for 0.1% solutions of pre-mixed polyethylene oxide (WSR301) and two prior art polyacrylamide friction reducers (DR3046 and DPFR) in 20% sodium chloride brine.
Figure 8:
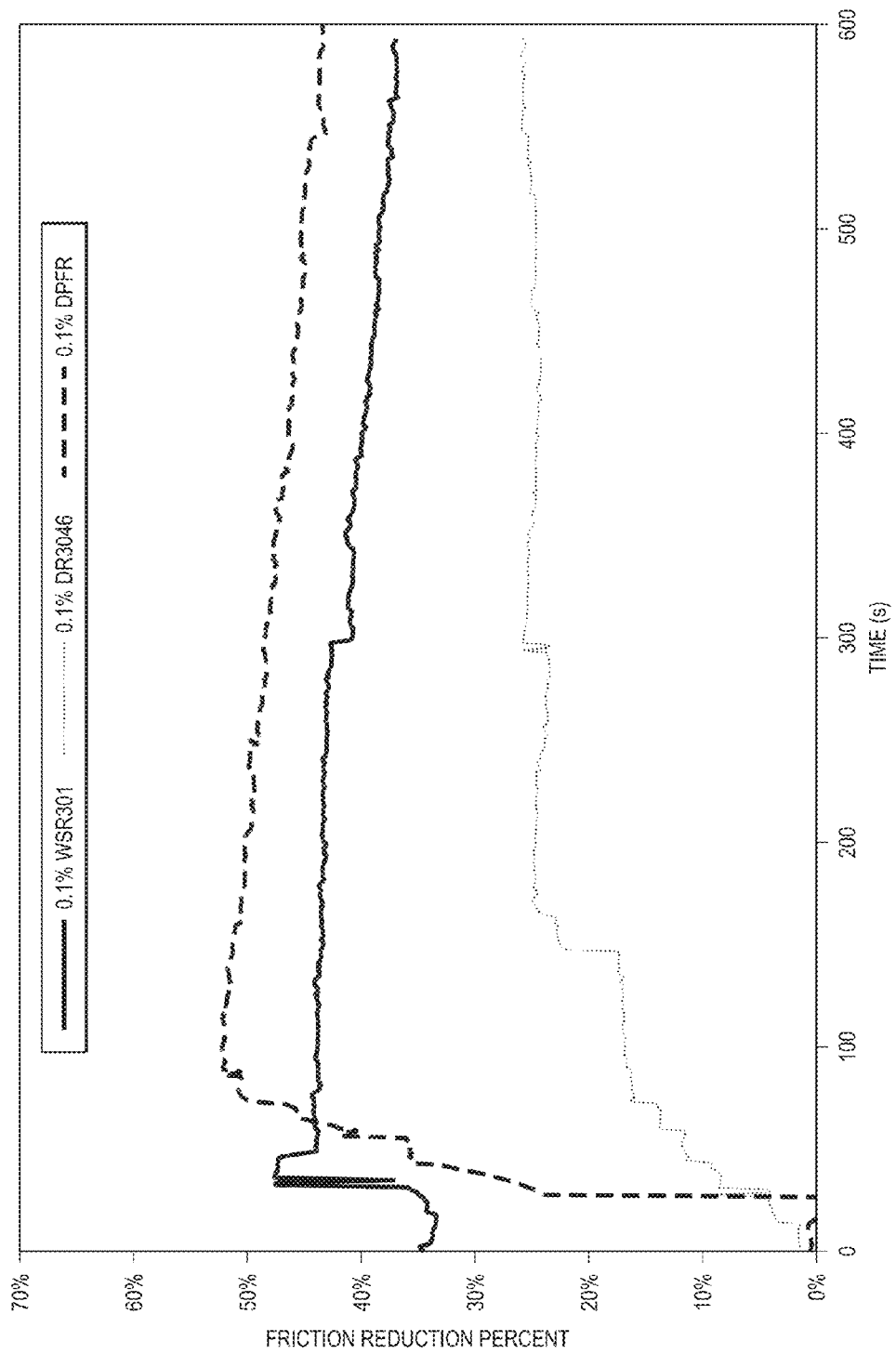
FIG. 8 is a plot of friction reduction over time for 0.1% solutions of pre-mixed polyethylene oxide (WSR301, WSRN12K) and two prior art polyacrylamide friction reducers (DR3046 and DPFR) in 5% calcium chloride brine.
Figure 9:
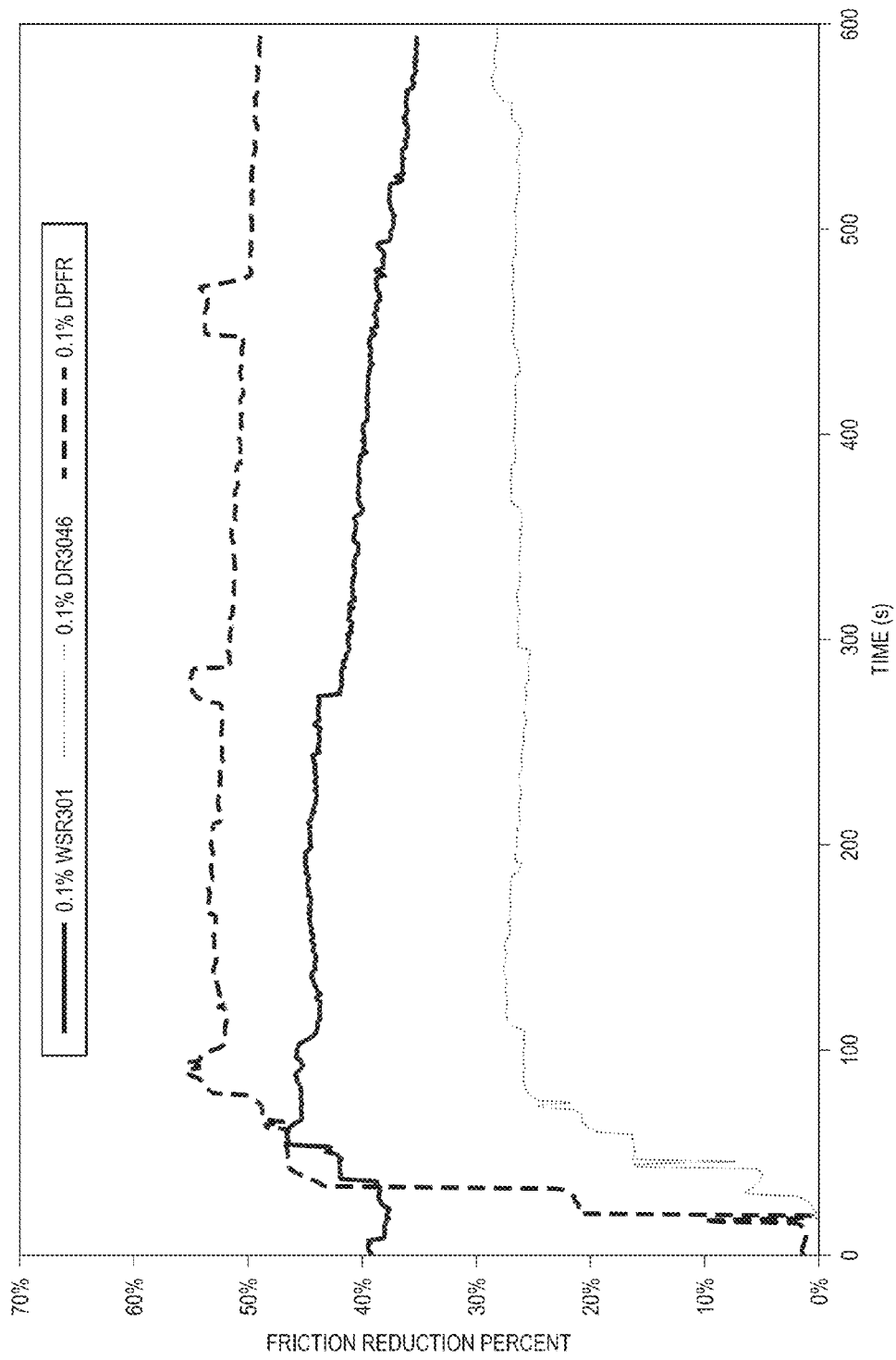
FIG. 9 is a plot of friction reduction over time for 0.1% solutions of pre-mixed polyethylene oxide (WSR301) and two prior art polyacrylamide friction reducers (DR3046 and DPFR) in 10% calcium chloride brine.
Figure 10:
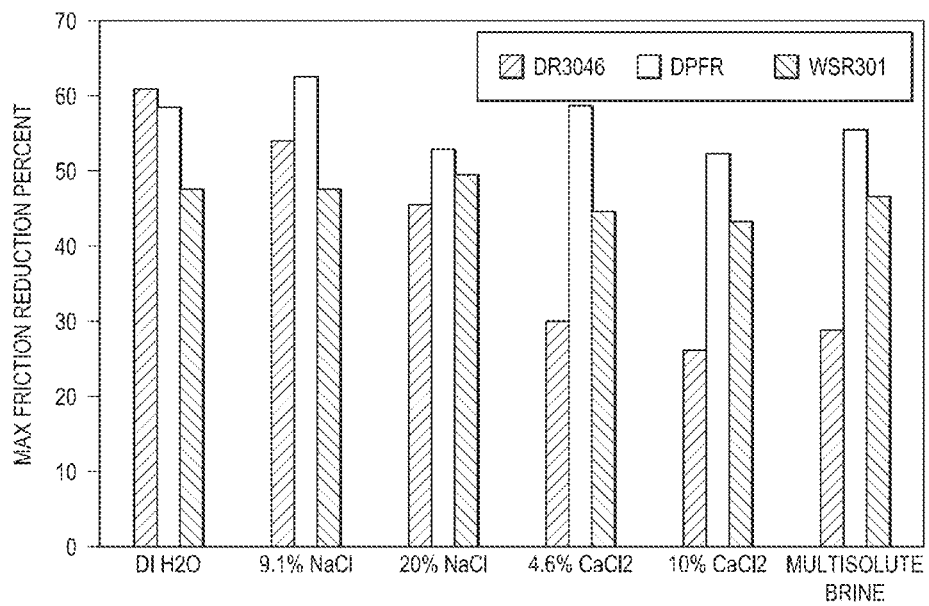
FIG. 10 is graph of maximum friction reduction observed for 0.1% solutions of pre-mixed polyethylene oxide (WSR301) and two prior art polyacrylamide friction reducers (DR3046 and DPFR) in deionized water and various brines.

This experiment was repeated with 0.1% solutions of WSR, DR3046, and DPFR in (i) 20% sodium chloride; (ii) 5% calcium chloride; (iii) 10% calcium chloride; and (iv) multisolute brine containing 7.4% sodium chloride and 1.76% calcium chloride. Percent friction reduction for a 0.1% solution of polyethylene oxide having a molecular weight of 1,000,000 (WSR N-12K) was also evaluated in 5% calcium chloride solution. As shown in FIG. 6, initial friction reduction by polyethylene oxide was superior to that of the polyacrylamide additives in 20% sodium chloride, but diminished over the course of the testing run. Results for experiments in 5% calcium chloride solution, 10% calcium chloride solution, and multisolute brine are shown in FIG. 7, FIG. 8, and FIG. 9, respectively. Friction reduction by polyethylene oxide (with molecular weight of 1,000,000 or 4,000,000) was superior to that observed for DR3046 and comparable to that observed for DPFR in 5% calcium chloride. Similar performance was observed for polyethylene oxide relative to the polyacrylamide additives in 10% calcium chloride solution and multisolute brine. Maximum friction reduction observed for the polyacrylamide additives and polyethylene oxide in deionized water and the various brines is summarized in FIG. 10.

d) Effect of Dispersant

Figure 11:
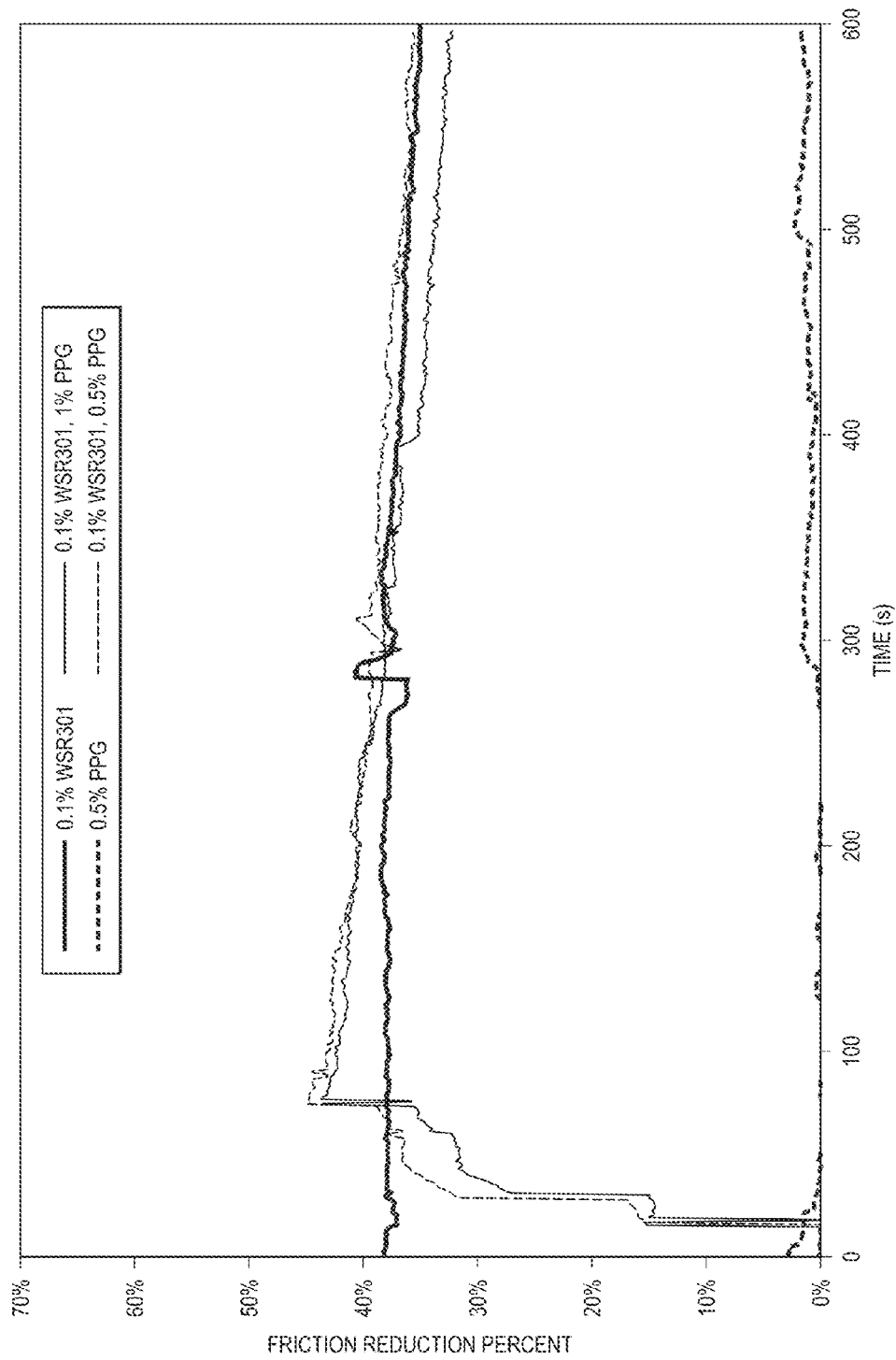
FIG. 11 is a plot of friction reduction over time for 0.1% solutions of pre-mixed polyethylene oxide, polyethylene oxide dispersed in polypropylene glycol at a weight ratio of 10:1 or 5:1 (PPG:PEO), and a 0.5% solution of polypropylene glycol alone, in deionized water.

To determine the effect of a representative dispersant on a representative friction reducing polymer as disclosed herein, the friction reduction of solutions of 0.1% polyethylene oxide (PEO) having a molecular weight of 4,000,000 (WSR301) alone or dispersed in polypropylene glycol (PPG) having a molecular weight of 400 at a weight ratio of 10:1 PPG:PEO or 5:1 PPG:PEO were evaluated. The friction reduction of a solution of 0.5% PPG alone was also evaluated. As shown in FIG. 11, friction reduction for all solutions of polyethylene oxide was comparable after approximately 60 seconds. As previously observed for the polyacrylamide solutions, which were not pre-mixed, a delay in onset of friction reduction was observed for the dispersed polyethylene oxide solutions. This delay is believed to correspond to the length of time necessary for hydration of the friction reducing polymers after addition to the aqueous base fluid. Minimal friction reduction was observed for solutions of polypropylene glycol alone.

Figure 13:
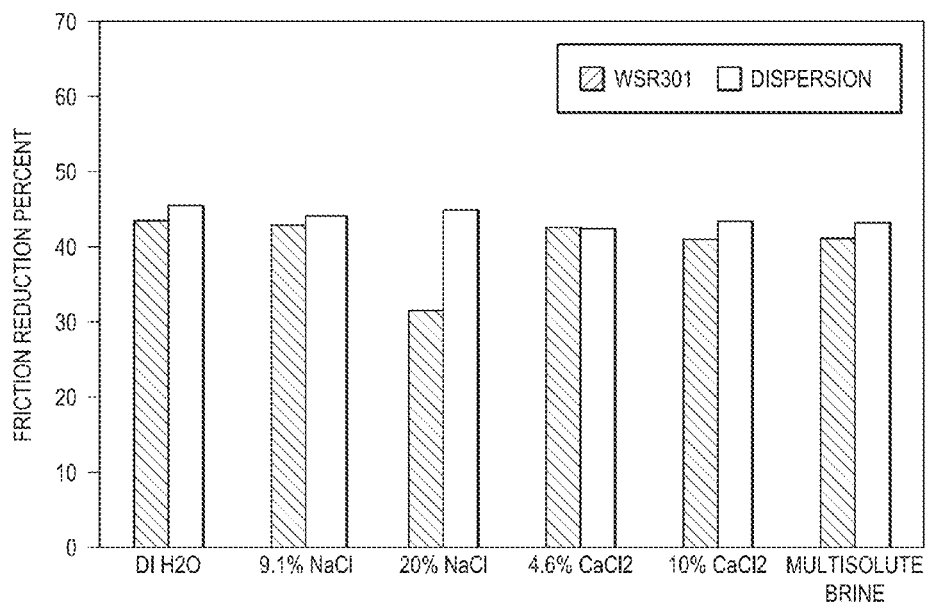
FIG. 13 is a graph of average friction reduction observed for 0.1% solutions of pre-mixed polyethylene oxide and polyethylene oxide dispersed in polypropylene glycol at a weight ratio of 5:1 (PPG:PEO), in deionized water and various brines.
Figure 12:
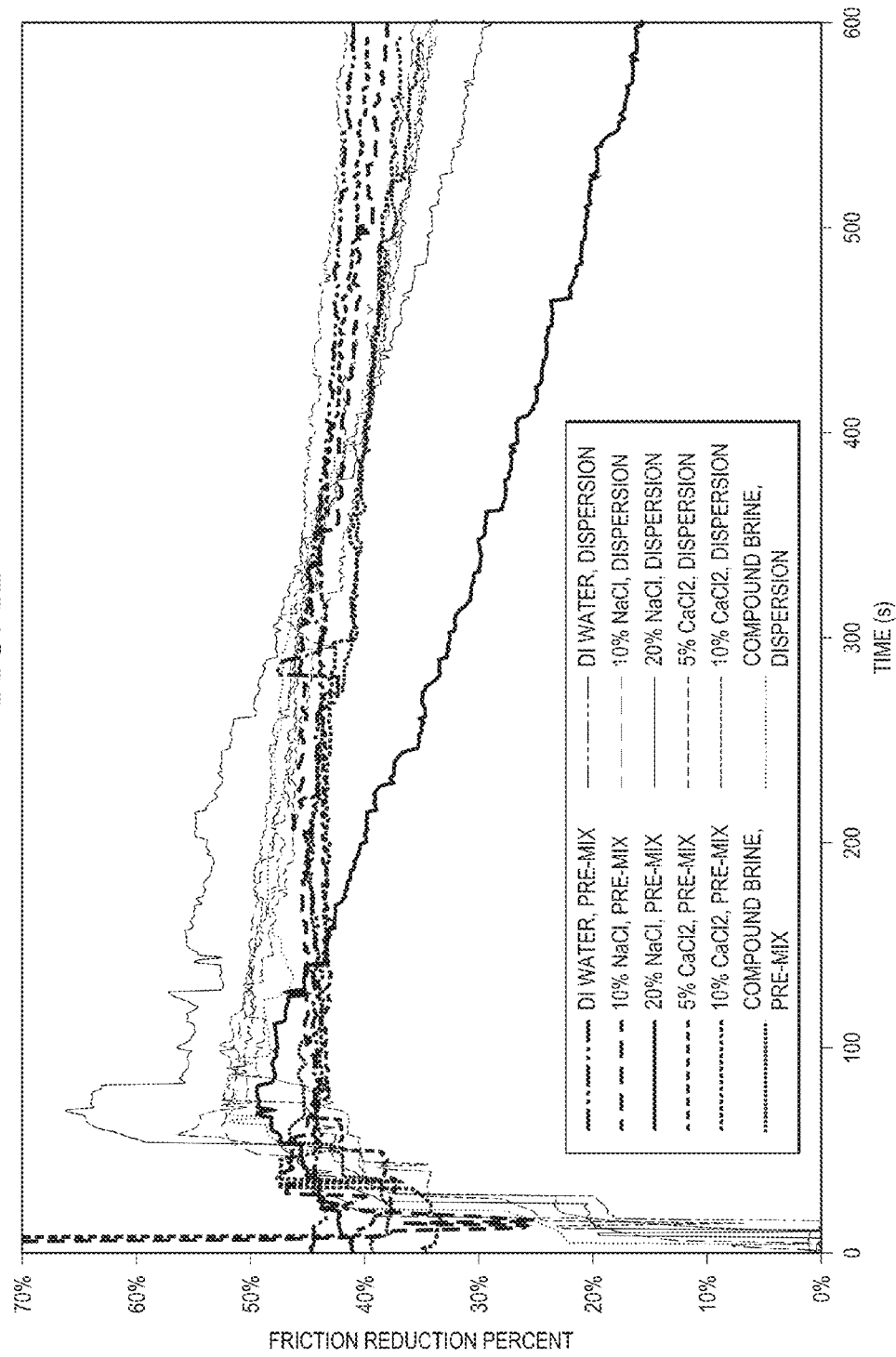
FIG. 12 is a plot of friction reduction over time for 0.1% solutions of pre-mixed polyethylene oxide and polyethylene oxide dispersed in polypropylene glycol at a weight ratio of 5:1 (PPG:PEO), in deionized water and various brines.

The friction reduction experiments for pre-mixed polyethylene oxide in deionized water and various brine solutions were repeated with polyethylene oxide dispersed in polypropylene glycol in a 5:1 PPG:PEO weight ratio. The observed friction reduction over time for both pre-mixed and dispersed polyethylene oxide in each aqueous base fluid is shown in FIG. 12, and the corresponding average friction reduction over time is summarized in FIG. 13. As shown in FIG. 12 and FIG. 13, the friction reduction observed with the polyethylene oxide friction reducers was generally independent of salt type and concentration, with the lone exception being the degradation observed in 20% sodium chloride. Friction reduction of 40% or greater was generally achieved in approximately 50 seconds or less, with maximum friction reduction achieved in less than 100 seconds. Comparable or slightly improved average friction reduction was observed for the friction reducers including the dispersant.

e) Discussion

Polyethylene oxide polymers having a broad range of molecular weights were shown to be consistently effective friction reducers across a wide range of salinities, and even at low concentrations. The friction reduction observed for polyethylene oxide was comparable to that observed for prior art polyacrylamide friction reducers, and was generally independent of the ionic composition of the aqueous base fluid. The polyethylene oxide was readily dispersed, avoiding the need for pre-mixing and storage of fracturing fluid, and moreover, both the polyethylene oxide polymers and the dispersant are believed to be environmentally benign. For dispersed polyethylene oxide friction reducers, onset of friction reduction was observed in approximately one minute, making the friction reducers suitable for fracturing operations, where friction reduction is required on the scale of minutes. The friction reducers of the present disclosure are readily available and relatively inexpensive. Moreover, the salt tolerance exhibited by the disclosed friction reducers makes them suitable for use with highly concentrated brines, such as recycled fracturing fluids.

Initial results suggest that clouded PPG droplets can act as a delivery system for introducing the PEO molecules into, or onto, the shale formation. In this case, the PPG would have three functionalities. First, PPG would act as a dispersion medium for delivering the PEO into a saline solution without clumping, and aiding solubilisation. Second, PPG would function as a shale stabilizing additive in its own right, both in its unclouded and clouded state. Finally. this kind of PPG delivery system, when clouded out, could bring PEO to the shale and possibly into the shale.

Example 2—Shale Stabilization by Representative Cloud Point Glycol Friction Reducers Materials and Methods PEO solutions with concentrations of 0.1% w/w and 0.01% w/w were prepared by gently pouring PEO powder in base fluid brine while it was vigorously mixed on a stir plate. Once all the powder was dispersed in the solution, the stir rate was gradually reduced. Mixing continued for 3 to 12 hours until complete dissolution was visually apparent. Since PEOs are subject to oxidative and shear degradations, they were continuously mixed until testing and used within three days of preparation. For dispersed solutions, PEO was dispersed in PPG by pouring the powder into the liquid PPG. Before the dispersion was pipetted in the base fluid brine, it was briefly shaken to ensure that the dispersion was homogeneous. The PEO-PPG dispersion in the base fluid was mixed until complete dissolution, for 30 minutes at about 200 rpm. The concentration of PEO in the PEO-PPG dispersion was 16.7% w/w. This led to concentrations of 0.1% w/w and 0.5% w/w PPG in the final solutions. Like PEO solutions, PEO-PPG solutions were continuously mixed until testing and used within three days of preparation.

The cloud point temperature of various polyethylene oxide solutions was tested to determine the effect of PEO molecular weight, concentration, and salt concentration on cloud point. Solutions of PEO having molecular weights of 100,000 g/M (WSRN10), 300,000 g/M (WSRN750), 4,000,000 g/M (WSRN301), 5,000,000 g/M (WSR coag), and 7,000,000 g/M (WSR 303) at concentrations of 0.1%, 0.1%, and 1% were formed in water having between 0% and 20% salt concentration and the cloud point measured by heating and observation.

The brine solution was first formed by adding the proper mass of salt to deionized water in an Erlenmeyer flask. After salt dissolution, PEO powder was slowly added with strong stirring by a stir bar in the flask to ensure complete PEO hydration. After PEO powder addition, medium stirring was maintained for 30 to 180 minutes as required based on the molecular weight of the polymer until the solution was clear and homogeneous. After complete dissolution was observed, the solutions were heated on a stir plate until visibly cloudy, at which point the temperature of the solutions were recorded.

Figure 15:
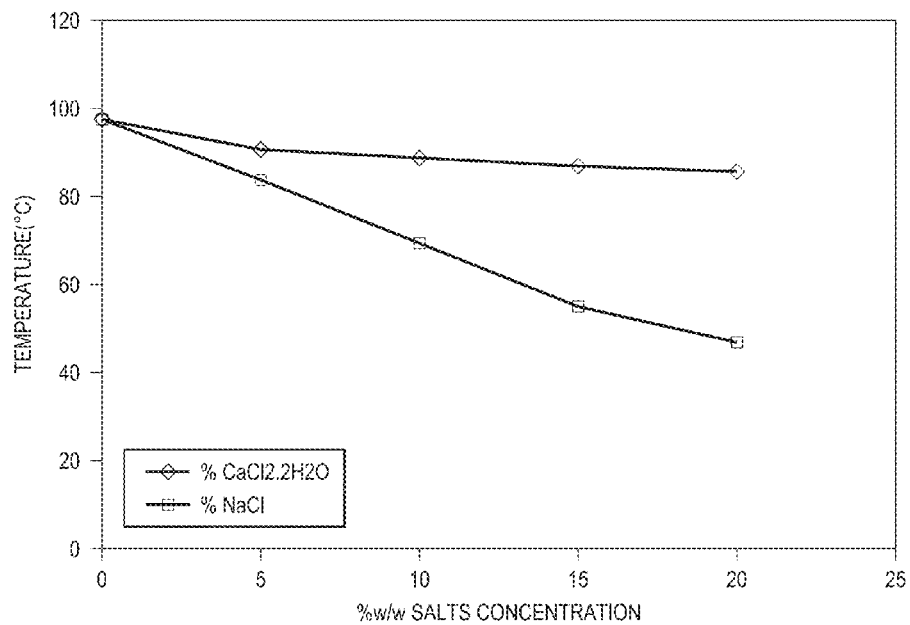
FIG. 15 is a graph of cloud point temperatures for solutions of a selected polyethylene oxide at a concentration of 0.01% w/w in solutions containing specified concentrations of NaCl or $CaCl_2$.
Figure 16:
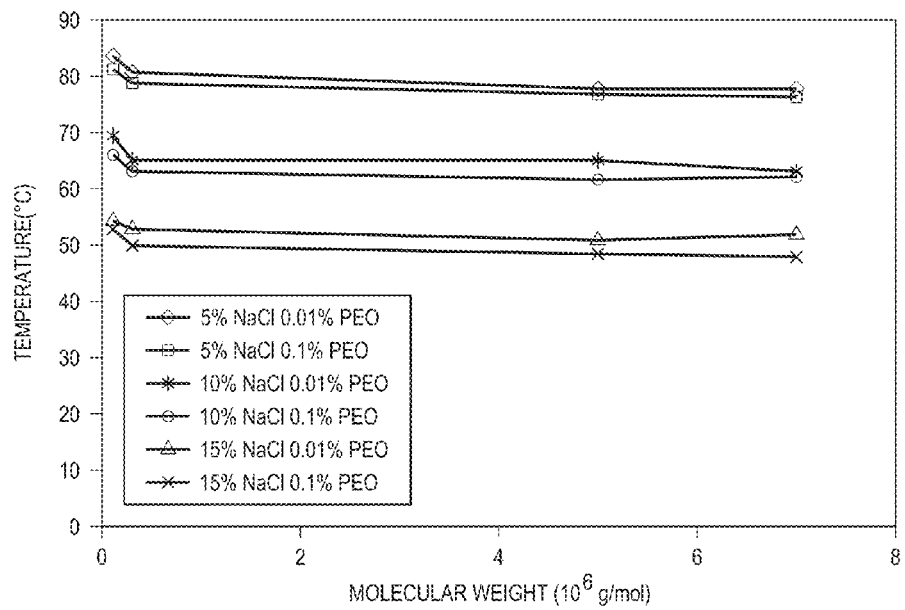
FIG. 16 is a graph of cloud point temperatures for solutions of polyethylene oxides having various molecular weights, the solutions containing the polyethylene oxides and sodium chloride at specified concentrations.
Figure 17:
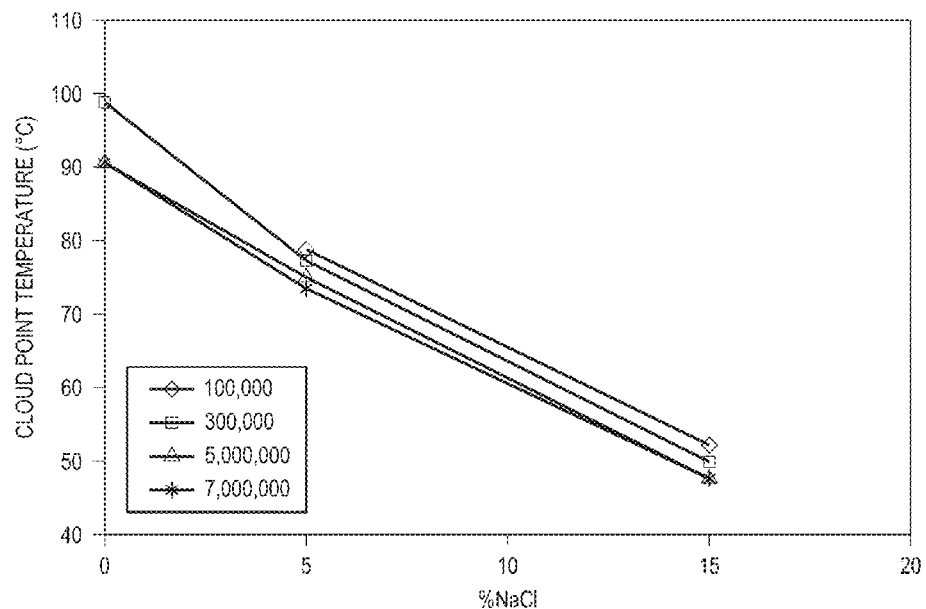
FIG. 17 is a graph of cloud point temperatures for solutions of a selected polyethylene oxide at a concentration of 0.01% w/w in solutions containing specified concentrations of NaCl.

FIG. 14 and FIG. 15 illustrate the dependence of cloud point temperature on salt concentration. As shown in FIG. 14, cloud point temperature decreased linearly with increasing NaCl concentration for all PEO polymers studied. As shown in FIG. 15, sodium chloride has a much stronger effect on cloud point temperature than does calcium chloride. FIG. 16 illustrates the effect of increased concentration and molecular weight of PEO on cloud point. As shown, increasing the molecular weight decreased the cloud point slightly, but the effect was negligible relative to the effect of sodium chloride concentration. FIG. 17 illustrates the effect of sodium chloride concentration on 1% solutions of PEO having various molecular weights. The results are consistent with the observations of 0.01% w/w PEO solutions in FIG. 16 and the observations for 0.1% w/w PEO solutions (see Table 1, above).

Shale degradation in various brines and brine-friction reducer solutions was qualitatively evaluated by immersion of preserved Gulf of Mexico-12 ("GOM-12") shale samples in the brines in a beaker at ambient temperature. Pictures were taken at regular intervals and the degree of degradation over time was evaluated.

Figure 18:
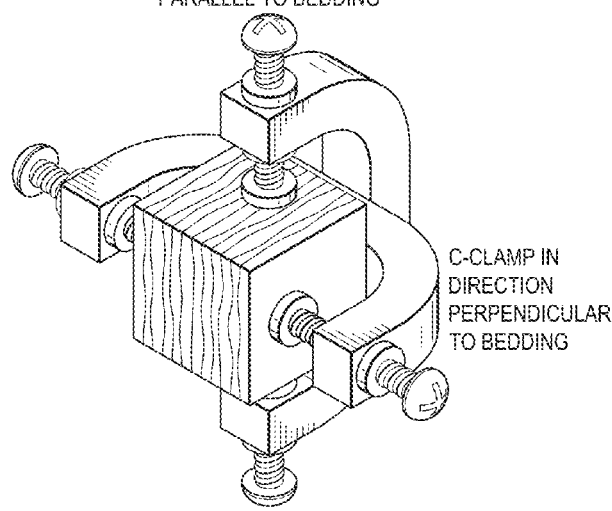
FIG. 18 is a photograph of an experimental setup for measurement of shale swelling.

Shale swelling due to contact with various brines and brine-friction reducer solutions was qualitatively evaluated by immersing the GOM-12 shale samples in a test solution while recording the swelling of the shale at ambient temperature. As can be seen in FIG. 18, a resistance probe measured the change in shape of two C-clamps in the direction perpendicular to the bedding and in the direction parallel to the bedding.

Hot-rolling oven experiments were conducted to quantitatively assess the effect of the cloud point glycol friction reducers in various brines on shale degradation at elevated temperatures approximating those experienced downhole in situ at or proximate to the surface of a hydrocarbon-bearing shale formation. The hot-rolling oven dispersion (HRO) tests screened the effectiveness of additives to maintain the integrity of shale cuttings. As shale dispersion is one of the consequences of water uptake, HRO tests provided an evaluation of shale cuttings stability.

Forty-eight hours prior to testing, Pierre shale cuttings were ground, sieved and stored in a desiccator corresponding to their native water activity. The cutting sizes ranged between 0.5 mm to 2 mm (mesh 35 and 10). On the day of the experiment, 2 g of cuttings were poured into a mason jar containing 200 mL of the test solution. The mass of shale in each jar was recorded. All the jars were then placed in a hot-rolling oven (OFITE, Inc., Houston, Tex.) at 70° C. The movement of the rollers in the oven was set at a constant speed of 25 rpm. After hot-rolling for 3 h, 8 h, and 12 h, the cuttings were rinsed with 50 mL of deionized (DI) water, and poured onto 35 mesh sieves. The sieves were placed in a drying oven for 24 h at 110° C. The retained dried shale was then weighed for each sieve. Additionally, at the beginning of each HRO test, about 5 g of shale cuttings were set aside for initial water content measurement: They were weighed before and after drying, and native water content (% w) was calculated as the difference between the weight of the cuttings before and after drying divided by the weight of the cuttings before drying. The final mass of retained dry shale ($M_f$) was then compared to the dry mass of initial cuttings ($M_i$) (determined by subtracting the initial water content weight percentage ("% w")) to determine the percentage of shale retained (% SR), according to Formula I below.

$$\% \, SR = 100 \times \frac{mf}{Mi*(100 - \% \, w)} \qquad \text{Formula I}$$

In the cases where polymeric solution was retained on the sieve, stuck to the cuttings, or could not be completely removed with DI water, such as where the friction reducer clouded out during the experiment, the mass of the filtrate was measured to determine the percentage of shale retained. Under this alternate protocol, the filtrate from the sieve was re-filtered on a paper filter that removed particles larger than 5 μm and on a glass microfiber filter that retained particles larger than 1.5 μm. The shale from the sieve filtrate that was retained on the filters was then dried, and its mass filtrate was recorded and compared to the initial mass of cuttings ($M_i$) according to Formula II below.

$$\% \, SR = 100 \times \frac{Mi*(100 - \% \, w) - Mf}{Mi*(100 - \% \, w)} \qquad \text{Formula II}$$

Figure 19:
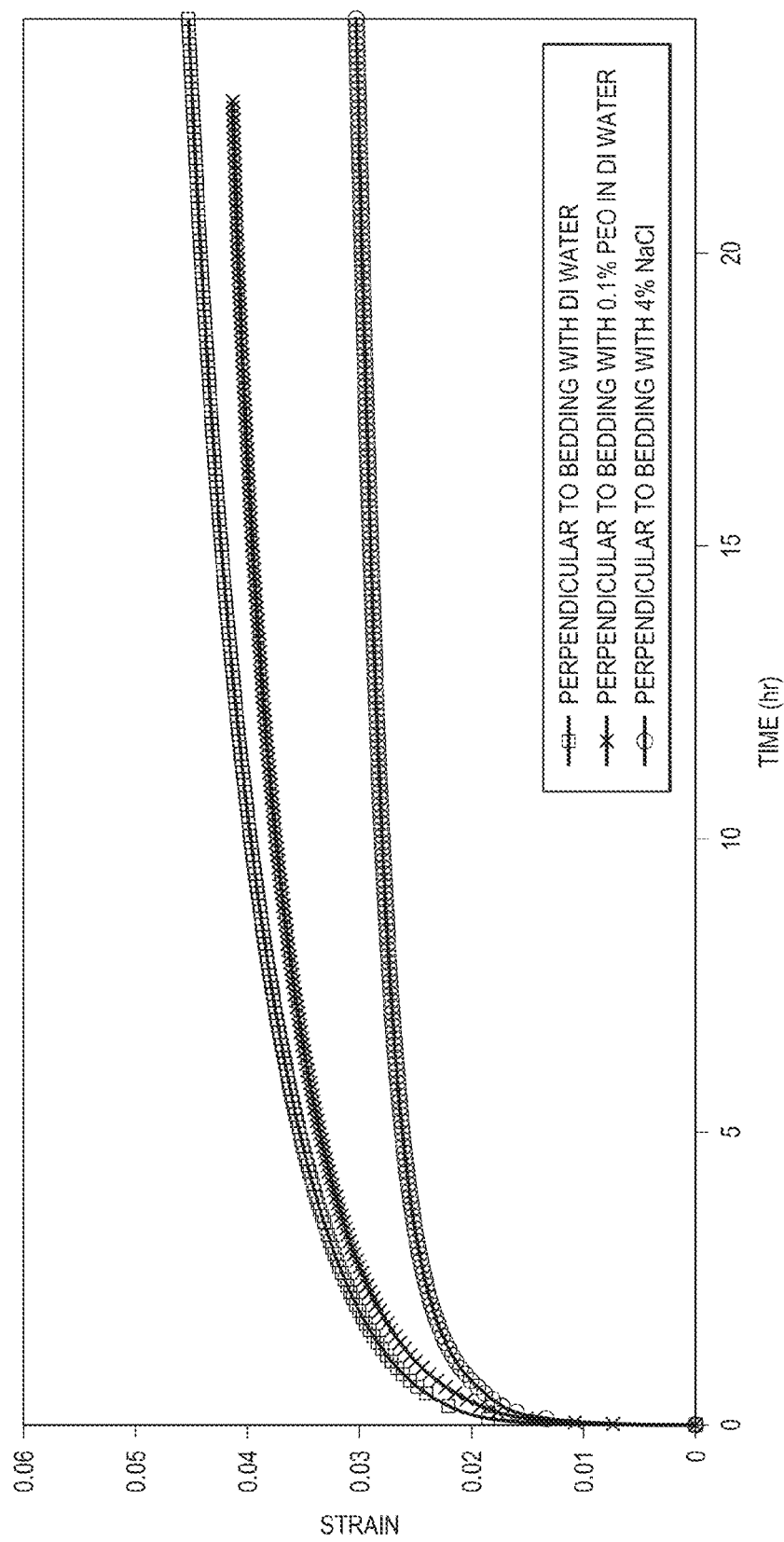
FIG. 19 is a representative graph of shale swelling, shown as strain, over time after exposure to specified solutions.
Figure 20:
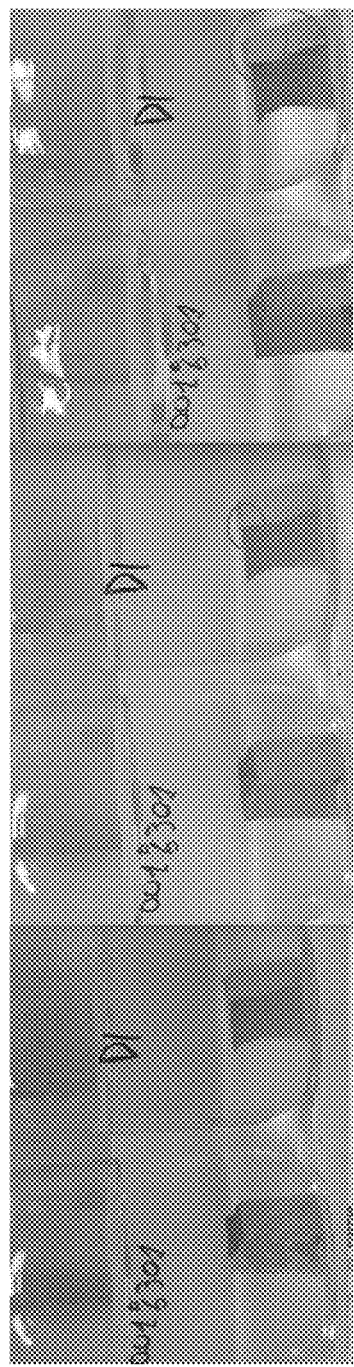
FIG. 20 is a series of photographs depicting the results of shale immersion experiments at ambient temperature.
Figure 21:
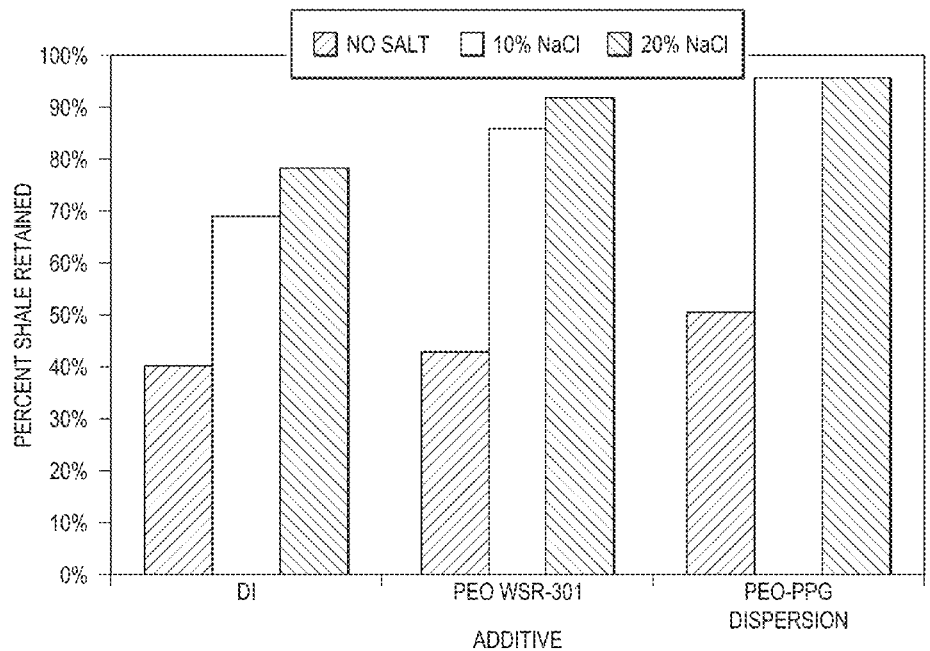
FIG. 21 is a graph of percentage shale retained in shale retention experiments conducted at elevated temperature with friction reducers according to the present disclosure and acqueous base fluids of varying salinity.

Results a) Effect of Friction Reducers on Shale Swelling at Ambient Temperatures Swelling tests were performed to compare the effects of the contact of a representative cloud point glycol PEO friction reducer solution, DI water, and a 4% NaCl solution with shale at ambient temperature. As shown in FIG. 18), greater swelling was observed in the direction perpendicular to bedding when GOM-12 was immersed in DI water than when immersed in a solution of DI water and 0.1% WSR-301 or in a 4% NaCl solution. The reduction in swelling associated with the friction reducing polymer relative to deionized water at ambient temperature was relatively low compared to the reduction observed with the saline solution. The saline solution is predicted to be an effective shale swelling inhibitor due to the intrinsic delay of osmotic transport of water of the salt ions.

b) Effect of Cloud Point Glycol Friction Reducers on Shale Retention at Ambient Temperature Beaker tests were conducted at ambient temperature in order to qualitatively compare the effects of PEO WSR-301 and DI water on GOM-12. As shown in FIG. 19, small cracks appeared on the shale sample after 1.5 hours of immersion in DI water, while no sign of shale degradation was visible in the jar containing 0.01% PEO. The fractures observed with immersion in DI water were more apparent after 44 hours of immersion.

c) Effect of Cloud Point Glycol Friction Reducers on Shale Retention at Elevated Temperature The effect of cloud point glycol PEO friction reducers in brines on the stability of shale shale cuttings at 70° C. was tested in the HRO. As can be seen in FIG. 20, the friction reducers both with and without the PPG dispersant improved the percentage of shale retained relative to brine without a cloud point glycol friction reducer. Moreover, the shale stabilization effect was more pronounced with increased salinity (i.e., percentage of dissolved ions) in the brine, and was significantly higher in brines than in deionized water. Without limitation to theory, it is believed that the cloud point glycol polymers in the friction reducers, which precipitate out of solution into micelles at and above their cloud point temperature in solution, deposit on the surface of the shale in a water-impermeable barrier, thereby stabilizing the shale against mechanical abrasion and against degradation caused by shale hydration. It protected the cuttings from abrasion and prevented water from entering the shale matrix. Additionally, the improved shale integrity previously observed with increasing salts concentration was not apparent in these experiments. Shale retention of up to 88% was observed with the cloud point glycol friction reducers, and was not further increased by increased concentration of NaCl in the brines. Again without limitation to theory, it is believed that the stabilization due to the cloud point glycol friction reducers predominates over the reduced shale hydration associated with increased brine salinity:

d) Effect of Cloud Point Temperature on Shale Stabilization

Figure 22:
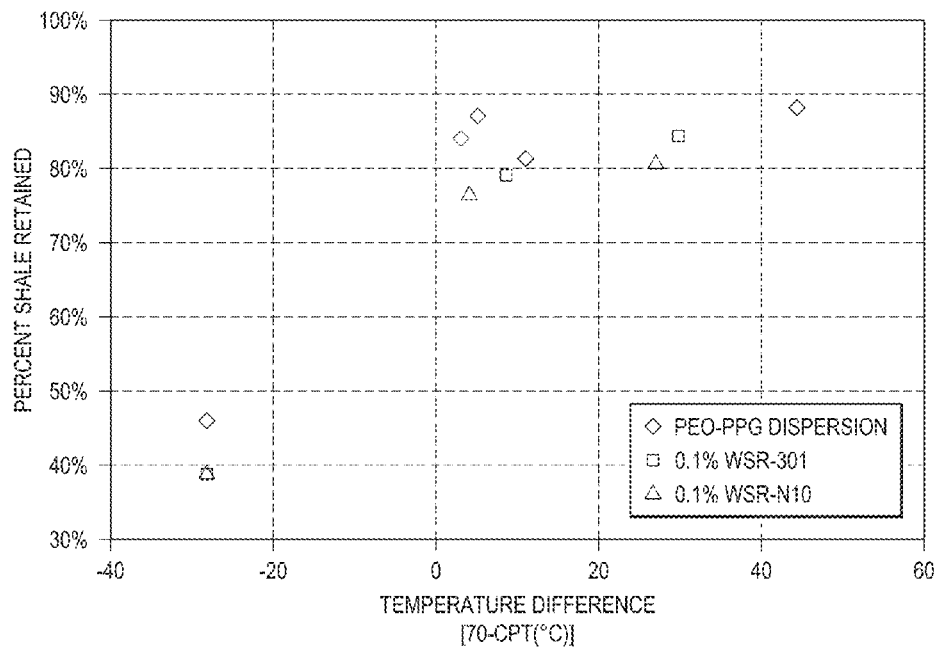
FIG. 22 is a plot of the percentages of shale retained at the conclusion of shale retention experiments versus the difference in temperature between the experimental condition and the cloud point temperature of the solutions of representative friction reducers according to the present disclosure.

The percentages of shale retained of various PEO-salt solutions are plotted versus the temperature difference between 70° C. and their cloud point temperatures in FIG. 22. In the bottom left part of the graph, the solutions that did not cloud out resulted in between 39% and 46% of shale retained. In the top right part of the graph, all the PEOs that precipitated out of the solutions are represented, and the percentage of shale retained was between 77% and 88%. This behavior is similar to a step function. There was no clear improvement of the shale stabilization at more advanced stages of the precipitation at higher temperatures. Once the HRO temperature was above the CPT of the solution, the percentage of shale retained increased and stabilized around 83%. Lower CPT solutions did not give rise to higher percentages of shale retained.

e) Effect of Friction Reducer Concentration and Molecular Weight on Shale Stabilization FIG. 23 shows the results for 0.1% and 0.01% of WSR-301 and of the lower molecular weight PEO, WSR-N10 at 0.1%. As shown, the extent of shale retention was not dependent on the molecular weight nor on the concentration of the PEO friction reducers.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A fracturing fluid comprising:
   an aqueous base fluid;
   a drag friction reducer, wherein the friction reducer is a linear polyalkylene polymer having a molecular weight between 10,000 and 10,000,000; and
   a dispersant.

2. The fracturing fluid of claim 1, wherein the concentration of the friction reducer is about 0.1% or less by weight of the fracturing fluid.

3. The fracturing fluid of claim 1, wherein the friction reducer is polyethylene oxide.

4. The fracturing fluid of claim 3, wherein the polyethylene oxide has a molecular weight between 1,000,000 and 7,000,000.

5. The fracturing fluid of claim 1, wherein the dispersant is provided in a ratio of about 1:1 to about 10:1 by weight relative to the friction reducer.

6. The fracturing fluid of claim 5, wherein the dispersant is polypropylene glycol.

7. The fracturing fluid of claim 1, wherein the aqueous base fluid is a brine comprising one or more dissolved inorganic salts in a total concentration between 0.1 and 20 weight percent of the total weight of the aqueous base fluid.

8. The fracturing fluid of claim 7, wherein inorganic salt is comprises one or more monovalent or divalent cations.

9. The fracturing fluid of claim 1, wherein at least a portion of the aqueous base fluid is flowback water.

10. The fracturing fluid of claim 1, wherein the friction reducer has a cloud point temperature between 60° C. and 90° C.

11. The fracturing fluid of claim 1, wherein the aqueous base fluid comprises fresh fracturing fluid recycled fracturing fluid, flowback fracturing fluid or backproduced fracturing fluid, or combinations thereof.

12. The fracturing fluid of claim 1, wherein the friction reducer comprises an ethylene oxide polymer.

13. The fracturing fluid of claim 1, wherein the friction reducer comprises a propylene oxide polymer.

14. The fracturing fluid of claim 1, wherein the friction reducer comprises an ethylene oxide-propylene oxide copolymer.

15. The fracturing fluid of claim 1, wherein the friction reducer comprises a combination of ethylene oxide polymers, propylene oxide polymers, or ethylene oxide-propylene oxide co-polymers.

16. The fracturing fluid of claim 5, wherein the dispersant is a solvent or co-solvent for the friction reducer.

17. The fracturing fluid of claim 5, wherein the dispersant is a liquid comprising at least one $C_1$-$C_6$ alcohol or diol.

18. The fracturing fluid of claim 5, wherein the dispersant has a molecular weight of between 20 and 10,000 Daltons.

19. The fracturing fluid of claim 8, where the divalent cations comprise calcium cations.

20. The fracturing fluid of claim 8, wherein the divalent cations comprise magnesium cations.

21. The fracturing fluid of claim 8, wherein the divalent cations comprise both calcium cations and magnesium cations.

22. The fracturing fluid of claim 8, wherein the monovalent cations comprise sodium cations.

23. The fracturing fluid of claim 8, wherein the monovalent cations comprise potassium cations.

24. The fracturing fluid of claim 8, wherein the monovalent cations comprise both sodium cations and potassium cations.

* * * * *